(12) United States Patent
Asuke

(10) Patent No.: US 9,427,668 B2
(45) Date of Patent: Aug. 30, 2016

(54) STORAGE MEDIUM STORING GAME PROGRAM AND GAME APPARATUS FOR IMPROVED COLLISION DETECTION IN A VIDEO GAME

(75) Inventor: Shigeyuki Asuke, Kyoto (JP)

(73) Assignee: Nintendo Co., Ltd., Kyoto (JP)

( * ) Notice: Subject to any disclaimer, the term of this patent is extended or adjusted under 35 U.S.C. 154(b) by 1246 days.

(21) Appl. No.: 12/534,563

(22) Filed: Aug. 3, 2009

(65) Prior Publication Data

US 2010/0304870 A1 Dec. 2, 2010

(30) Foreign Application Priority Data

May 29, 2009 (JP) ................................. 2009-130783

(51) Int. Cl.
  *A63F 13/10* (2006.01)
  *A63F 13/577* (2014.01)
  *A63F 13/40* (2014.01)

(52) U.S. Cl.
  CPC ............. *A63F 13/577* (2014.09); *A63F 13/10* (2013.01); *A63F 2300/643* (2013.01)

(58) Field of Classification Search
  CPC ........ A63F 13/22; A63F 13/40; A63F 13/44; A63F 13/577; A63F 2300/638; A63F 2300/643
  USPC ...................................... 463/1–9, 43, 49, 53
  See application file for complete search history.

(56) References Cited

U.S. PATENT DOCUMENTS

| | | | |
|---|---|---|---|
| 4,905,147 A * | 2/1990 | Logg | 463/31 |
| 6,028,593 A * | 2/2000 | Rosenberg et al. | 345/156 |
| 6,336,864 B1 * | 1/2002 | Nakanishi | 463/33 |
| 6,582,299 B1 * | 6/2003 | Matsuyama et al. | 463/2 |
| 7,637,813 B2 * | 12/2009 | Katayama et al. | 463/31 |
| 7,663,630 B2 * | 2/2010 | Kim et al. | 345/473 |
| 7,982,739 B2 * | 7/2011 | Pasula | 345/473 |
| 8,020,029 B2 * | 9/2011 | Aggarwal et al. | 714/2 |
| 2006/0233098 A1 * | 10/2006 | McArdle | 370/216 |
| 2006/0258445 A1 * | 11/2006 | Nishimori et al. | 463/30 |
| 2007/0087836 A1 * | 4/2007 | Pasula | 463/43 |
| 2007/0197284 A1 * | 8/2007 | Fujioka et al. | 463/30 |
| 2007/0265043 A1 * | 11/2007 | Wang et al. | 463/2 |
| 2008/0183382 A1 * | 7/2008 | Asai et al. | 701/210 |
| 2009/0104995 A1 * | 4/2009 | Matsuyama et al. | 463/42 |
| 2009/0241038 A1 * | 9/2009 | Izuno et al. | 715/757 |
| 2009/0267951 A1 * | 10/2009 | Chang et al. | 345/474 |
| 2009/0310027 A1 * | 12/2009 | Fleming | 463/43 |
| 2011/0078571 A1 * | 3/2011 | Asbahr et al. | 715/716 |

FOREIGN PATENT DOCUMENTS

| | | |
|---|---|---|
| JP | 11-47448 | 2/1999 |
| JP | 2008-125721 | 6/2008 |
| JP | 2010-220878 | 10/2010 |

* cited by examiner

*Primary Examiner* — Dmitry Suhol
*Assistant Examiner* — David Duffy
(74) *Attorney, Agent, or Firm* — Nixon & Vanderhye, P.C.

(57) ABSTRACT

A computer readable storage medium storing a game program and a game apparatus capable of preventing a game process which is performed, depending on a result of contact determination with respect to objects from being illogical for a player are provided. In the game apparatus, a contact determination section repeatedly determines whether a player object contacts a block. The results of determination are successively stored into a determination result storing section. A first processing section permits the player object to jump when, of the results of determination stored in the determination result storing section, at least one result of determination including a result of determination a predetermined period of time before indicates that the player object contacts the block.

22 Claims, 21 Drawing Sheets

STORAGE MEDIUM STORING GAME PROGRAM AND GAME APPARATUS FOR IMPROVED COLLISION DETECTION IN A VIDEO GAME

CROSS REFERENCE TO RELATED APPLICATION

The disclosure of Japanese Patent Application No. 2009-130783, filed May 29, 2009, is incorporated herein by reference.

BACKGROUND OF THE INVENTION

1. Field of the Invention

The present invention relates to a storage medium storing a game program executable by a computer of a game apparatus, and a game apparatus. More particularly, the present invention relates to a storage medium storing a game program executable by a computer of a game apparatus which determines whether or not objects contacts each other in a game space and performs a game process, depending on the result of determination, and a game apparatus.

2. Description of the Background Art

In so-called shooting games and action games, it is determined whether or not objects appearing in a game space contacts each other (see, for example, Japanese Patent Laid-Open Publication No. H11-47448). Japanese Patent Laid-Open Publication No. H11-47448 describes a game apparatus in which determination areas are previously set with respect to various objects, such as a player object operated by a player, a bullet, a missile or laser shot by the player object, an enemy object, a bullet, a missile or laser shot by the enemy object, and the like. The sizes, numbers, arrangements and the like of the determination areas are defined, depending on the sizes and the like of the objects. Each determination area is moved in the game space in accordance with the movement of the corresponding object. In the game apparatus, by determining whether or not these determination areas contact each other, it is determined whether or not a bullet shot from an enemy character hits a player object, for example.

Conventional liquid crystal televisions have a function of temporarily storing a program received from a broadcast station in a memory and performing image processing so as to improve the image quality before displaying the program. Such image processing is also similarly performed with respect to game images which are transmitted from a game apparatus at predetermined time intervals, in addition to a program received from a broadcast station. Therefore, when the game apparatus described in Japanese Patent Laid-Open Publication No. H11-47448 is used while being connected to a liquid crystal television, there may be a slight time lag between the execution of a game process in a game apparatus and the actual display of a game image showing the result on the liquid crystal television. Specifically, there may be a delay between the execution of a game process including the contact determination in a game apparatus and the actual display of a game image showing a game space subjected to the game process on a liquid crystal television.

Here, a problem caused by the delay will be described with reference to FIGS. 21A to 21C, assuming a case where a player object is caused to jump in a game space, for example. FIGS. 21A to 21C are diagrams showing game images representing how a player object 90 moves on a block 91 in the game space. A game apparatus determines, in units of a frame, whether or not the block 91 exists at a foot of the player object 90 so that the player object 90 can kick the block 91 (contact determination). When a player provides an operational input to cause the player object 90 to jump, then only if the game apparatus determines that the block 91 exists at a foot of the player object 90, the player object 90 is caused to jump. In the presence of the aforementioned delay, when contact determination is performed with respect to the player object 90 and the block 91 in a game space indicated by the game image of FIG. 21C, the display device displays the game image of FIG. 21A which is two frames before the game image of FIG. 21C. In this case, the following phenomenon may occur. A player who views a game image (see FIG. 21A) thinks that they can cause the player object 90 to jump since the block 91 exists at a foot of the player object 90. Actually, however, the block 91, on which the player object 90 should kick, no longer exist at a foot of the player object 90 in a game space (see FIG. 21C) in which the game apparatus is performing the contact determination, since the player object 90 has already been moved. Therefore, the player object 90 cannot be caused to jump. In other words, in conventional game apparatuses, the timing of the contact determination performed in a game apparatus may be deviated from the timing of display of a game image showing a game space which is subjected to the contact determination, resulting in an illogical game process for the player.

This problem may arise with display devices, such as plasma televisions, monitors for personal computers, projectors and the like, which are likely to cause a delay as in liquid crystal televisions. Moreover, when a game apparatus is connected to a display device via one or more devices, such as a video cassette recorder or the like, the aforementioned problem may arise since the transfer rate of a game image from the game apparatus to the display device is reduced.

Moreover, for example, when the player object 90 is moving at high speed, a player may recognize that the player object 90 is not dropping from the block 91, though the player object 90 is actually dropping from the block 91. In this manner, there may be an error between the position of the player object 90 recognized by the player who actually views it in a game image, and the actual position of the player object 90. As a result, even if the aforementioned delay does not exist, a game process performed based on the result of contact determination may be illogical for the player.

SUMMARY OF THE INVENTION

Therefore, an object of the present invention is to provide a computer readable storage medium storing a game program and a game apparatus capable of preventing a game process performed based on the result of the contact determination of objects from being illogical for a player.

The present invention has the following features to attain the object mentioned above. Note that reference numerals, additional descriptions and the like inside parentheses in this section indicate correspondence to embodiments described below for the sake of easy understanding, and do not limit the present invention.

The present invention provides a computer readable storage medium storing a game program executable by a computer (10) of a game apparatus (3) which outputs to a display device (2) a game image showing a behavior of an object in a game space. The computer readable storage medium storing the game program causes the computer (10) to function as a contact determination means (S3, S51), a determination result storing means (S6), and a processing means (S10, S53). The contact determination means (S3, S51) repeatedly determines whether or not a first object contacts a second object. The determination result storing means (S6) successively stores results of determination performed by the contact determination means (S3, S51). The processing means (S10, S53) performs a predetermined process with respect to the first object when, of the results of determination stored in the determination result storing means (S6), at least one result of determination including a result of determination a predetermined period of time before satisfies predetermined conditions.

In the game apparatus (3), the contact determination means (S3, S51) determines whether or not the first object contacts the second object in a game process in which a plurality of objects including the first object and the second object are moved in a game space. Also, in the game apparatus (3), a game image showing the game space in which a game process including the contact determination is performed is generated and output to a display device (2). A series of these processes is repeatedly performed until the end of a game.

With this configuration, it is decided whether or not the predetermined process is to be performed by the processing means (S10, S53), taking into consideration the result of determination the predetermined period of time before. Here, the predetermined period of time is set to match or be substantially equal to a delay time between, for example, execution of the game process including the contact determination and the display of a game image showing a game space subjected to the game process on the display device (2). Therefore, it is decided whether or not the predetermined process is to be performed, taking into consideration a result of contact determination with respect to a game space shown by a game image which a player is viewing (a result of determination the predetermined period of time before). As a result, the state of a game space displayed on the display device (2) matches the state of a game space in which the contact determination is performed in the game apparatus (3), so that a game process illogical for a player is prevented from being performed.

Note that examples of the predetermined process performed by the processing means include a jump process of causing the first object (30) to jump based on an operational input performed by a player, a damage process of causing damage to the first object (30), and the like, and in addition, when the first object is a bullet shot from an enemy object, a process of visually erasing the bullet from a game space when the bullet contacts a player object.

The processing means (S10, S53) may perform the predetermined process with respect to the first object when at least one of the result of determination the predetermined period of time before and a latest result of determination satisfies the predetermined conditions.

In some display devices (2) connected to the game apparatus (3), there may be substantially no delay between execution of the contact determination and the display of a game image showing a game space subjected to the contact determination. In this case, if only the result of determination the predetermined period of time before is taken into consideration, the state of a game space shown by a game image which a player is viewing does not match the state of a game space subjected to the contact determination in the game apparatus (3).

With this configuration, it is decided whether or not the predetermined process is to be performed with respect to the first object, based on both the a result of determination the predetermined period of time before and a latest result of determination, taking into consideration the presence or absence of such a delay. Thus, the predetermined process is performed, taking into consideration a result of the contact determination with respect to a game space shown by a game image which a player is viewing, irrespective of the presence or absence of a delay. Therefore, a game process natural for a player can be performed.

The processing means may perform the predetermined process with respect to the first object when at least one of the result of determination the predetermined period of time before and the latest result of determination indicates that the first object contacts the second object (S9).

With this configuration, for example, when the predetermined process is a jump process of causing a player object to jump, a player can more easily cause the player object to jump. In other words, the difficulty of a game can be reduced.

The game apparatus (3) may include an input device (7) which is operated by a player. The computer readable storage medium storing the game program may cause the computer (10) to further function as a reception means (S7) for receiving an operational input from the input device. In this case, the processing means may perform the predetermined process with respect to the first object when at least one of a result of determination at the time of the reception of the operational input by the reception means and a result of determination a predetermined period of time before the time of the reception of the operational input satisfies the predetermined conditions.

With this configuration, when a player operates the input device, it is decided whether or not the predetermined process is to be performed with respect to the first object, taking into consideration the result of determination the predetermined period of time before in addition to the latest result of determination. Therefore, a game process natural for the player can be performed with timing natural to the player.

The processing means may perform the predetermined process with respect to the first object when at least one of the result of determination the predetermined period of time before, the latest result of determination, and a result of determination stored in the determination result storing means (S6) after the result of determination the predetermined period of time before and before the latest result of determination, satisfies the predetermined conditions.

With this configuration, when the predetermined process is performed, three or more results of determination including the result of determination before the predetermined period of time, the latest result of determination, and the result of determination therebetween, are taken into consideration. Therefore, the decision of whether or not the predetermined process is to be performed can be performed more correctly than when two results of determination, i.e., the result of determination the predetermined period of time before and the latest result of determination, are taken into consideration.

The processing means may perform the predetermined process with respect to the first object when only the result of determination the predetermined period of time before satisfies the predetermined conditions.

When it is obvious that there is a delay between the execution of the contact determination and the display of a game image showing a game space subjected to the contact determination, the latest result of determination does not necessarily need to be taken into consideration. The aforementioned configuration is preferably applied when it is obvious that such a delay occurs.

The processing means may perform the predetermined process with respect to the first object when the at least one result of determination indicates that the first object contacts the second object (S9, S10).

With this configuration, even if not all results of determination that are used when it is decided whether or not the predetermined process is to be performed indicate that the first object contacts the second object, the predetermined process is performed by the processing means. Therefore, for example, when the first object is a player object operated by a player and the predetermined process is a jump process of causing a player object to jump, the player object can be more easily caused to jump. In other words, the difficulty of a game can be reduced.

The game apparatus (3) may include an input device (7) which is operated by a player. The computer readable storage medium storing the game program may cause the computer (10) to further function as a reception means for receiving an operational input from the input device (7). The first object may be a player object (30) which behaves in the game space based on the operational input received by the reception means.

Examples of the first object includes a player object (30), an enemy object, a bullet, laser or the like shot from these objects, and the like. When the first object is a player object (30) operated by a player, a most serious problem occurs due to the aforementioned delay. The aforementioned configuration is preferably applied to such a case.

The computer readable storage medium storing the game program may cause the computer to further function as an input determining means for determining whether or not the operational input received by the reception means is a predetermined operational input (S7). In this case, the processing means may perform the predetermined process only when the at least one result of determination satisfies the predetermined conditions and the input determining means determines that the operational input received by the reception means is the predetermined operational input.

This configuration is preferable to a case where, when a predetermined operational input to cause a player object to jump is provided from the input device (7), then only if there is a place which the player object kicks, the player object is caused to jump.

The second object may be an object (31) representing a topographic feature. The predetermined process may be a jump process of causing the first object (30) to jump by kicking or hitting the second object.

With this configuration, it is possible to prevent a game process illogical for a player from being performed. An example of such an illogical game process is that, although a player thinks that a player object (30) contacts a place which the player object kicks or hits to jump and can be caused to jump and then performs an operational input to cause the player object (30) to jump, the player object (30) cannot be jumped.

The second object may be an object (33) which causes damage to the first object (30). In this case, the processing means may perform a damage process of causing damage to the first object (30) as the predetermined process when all of the results of determination indicate that the first object (30) contacts the second object (33).

With this configuration, when any of the results of determination which are used to decide whether or not the predetermined process is to be performed indicates that the first object (30) does not contact the second object (33), the first object (30) is not damaged. Therefore, in a shooting game, an action game or the like in which the first object (30) is damaged by the second object (33), the difficulty of a game can be reduced.

The display device is any of a liquid crystal television (2), a monitor of a personal computer, a projector and a plasma television. In this case, the predetermined period of time is set to correspond to a delay time between execution of the contact determination by the contact determination means and display of a game image showing a game space subjected to the contact determination on the display device.

Not only in the liquid crystal television (2), but also in a monitor for a personal computer, a projector, or a plasma television, there is a delay between the execution of contact determination and the display of a game image showing a game space subjected to the contact determination on the display device, as is similar to when the liquid crystal television (2) is used as a display device. The present invention is preferably applied to a case the game apparatus (3) is connected to a display device having such a delay. By setting the predetermined period of time to be the same as or substantially the same as the delay time depending on the display device, a game process illogical for a player can be effectively prevented from being performed.

The computer readable storage medium storing the game program may cause the computer (10) to further function as a delay time receiving means for receiving the delay time of the display device to which the game apparatus (3) is connected, and a setting means for setting the predetermined period of time based on the delay time received by the delay time receiving means.

With this configuration, if a player only inputs a delay time, a game process illogical for a player can be easily prevented from being performed.

The game apparatus (3) may be communicably connected via a network to a database (8) for storing identification information for identifying a display device in association with the delay time. In this case, the computer readable storage medium storing the game program causes the computer to further function as a first acquisition means (S21), a second acquisition means (S22), and a setting means (S23). The first acquisition means (S21) acquires the identification information of the display device to which the game apparatus (3) is connected. The second acquisition means (S22) acquires from the database (8) a delay time corresponding to the identification information acquired by the first acquisition means (S21). The setting means (S23) sets the predetermined period of time based on the delay time acquired by the second acquisition means (S22).

The predetermined period of time can be set to have a value optimal to the display device. Therefore, a game process (predetermined process) which is performed, depending on a result of contact determination with respect to the first object and the second object can be more effectively prevented from being illogical for a player.

The predetermined period of time may be based on a moving speed of the first object (30).

When the first object (30) is moved at high speed, a position of the first object (30) visually recognized by a player who is viewing a game image may be deviated from an actual position of the first object (30). As a result, even when there is not the aforementioned delay, a predetermined process performed as a result of contact determination may be illogical for a player. By setting the predetermined period of time based on the moving speed of the first object (30), the predetermined process can be prevented from being illogical for a player.

The computer readable storage medium storing the game program may cause the computer (10) to further function as a speed detecting means (S41) and a time calculating means (S42, S43). The speed detecting means detects the moving speed of the first object (30). The time calculating means (S42, S43) calculates the predetermined period of time based on the moving speed detected by the speed detecting means (S41). The time calculating means (S42, S43) calculates the predetermined period of time so that the predetermined period of time increases with an increase in the moving speed detected by the speed detecting means (S41).

With this configuration, the predetermined period of time is changed so that a result of determination which is older as the moving speed of the first object (30) increases is read out as the result of determination the predetermined period of time before from the determination result storing means. As a result, the influence of an error between a position of the first object (30) visually recognized by a player and an actual position of the first object (30) on a game process performed by the game apparatus (3) can be effectively reduced.

The computer readable storage medium storing the game program may cause the computer (10) to further function as a speed detecting means for detecting a moving speed of the first object (30), and a speed determining means for determining whether or not the moving speed detected by the speed detecting means is a predetermined speed or higher. In this case, the processing means performs the predetermined process only when the at least one result of determination satisfies the predetermined conditions and the speed determining means determines that the moving speed detected by the speed detecting means is the predetermined speed or higher.

When the first object is moved at high speed in a game space, there may be an error between a position of the first object visually recognized by a player and an actual position of the first object, and as a result, a game process which is not intended by the player may be performed. For example, when the first object is a player object (30) and a player recognizes that the player object (30) is not dropping off a block (31), the player object (30) is actually dropping off the block (31). With the aforementioned configuration, the result of determination predetermined period of time before is taken into consideration under conditions that the moving speed of the first object is the predetermined speed or higher. Therefore, the influence of the aforementioned error on a game process can be reduced.

The processing means may be capable of executing two or more processes as the predetermined process with respect to the first object. The predetermined conditions may be previously defined for each of the two or more processes.

For example, when the predetermined process is a jump process, the jump process is preferably permitted if at least any of results of determination which are used to decide whether or not the jump process is to be performed indicates that the first object contacts the second object. Also, for example, when the predetermined process is a damage process, the damage process is preferably performed if all results of determination which are used to decide whether or not the damage process is to be performed indicate that the first object contacts the second object. With the aforementioned configuration, the predetermined process performed by the processing means can be performed under conditions optimal to the predetermined process.

The present invention also provides a game apparatus (3) for outputting to a display device (2) a game image showing a behavior of an object in a game space. The game apparatus (3) includes a contact determination means (33, S51), a determination result storing means (S6), and a processing means (S10, S53). The contact determination means (S3, S51) repeatedly determines whether or not a first object contacts a second object. The determination result storing means (36) successively stores results of determination performed by the contact determination means (S3, S51) into a memory (12). The processing means performs a predetermined process with respect to the first object when, of the results of determination stored in the memory (12), at least one result of determination including a result of determination a predetermined period of time before satisfies predetermined conditions.

According to the present invention, when a predetermined process is performed as a game process, a result of determination a predetermined period of time before a latest result of determination is taken into consideration. Therefore, a process which is performed, depending on a result of contact determination of objects can be prevented from being illogical for a player.

These and other objects, features, aspects and advantages of the present invention will become more apparent from the following detailed description of the present invention when taken in conjunction with the accompanying drawings.

DESCRIPTION OF THE PREFERRED EMBODIMENTS

First Embodiment

Figure 1:
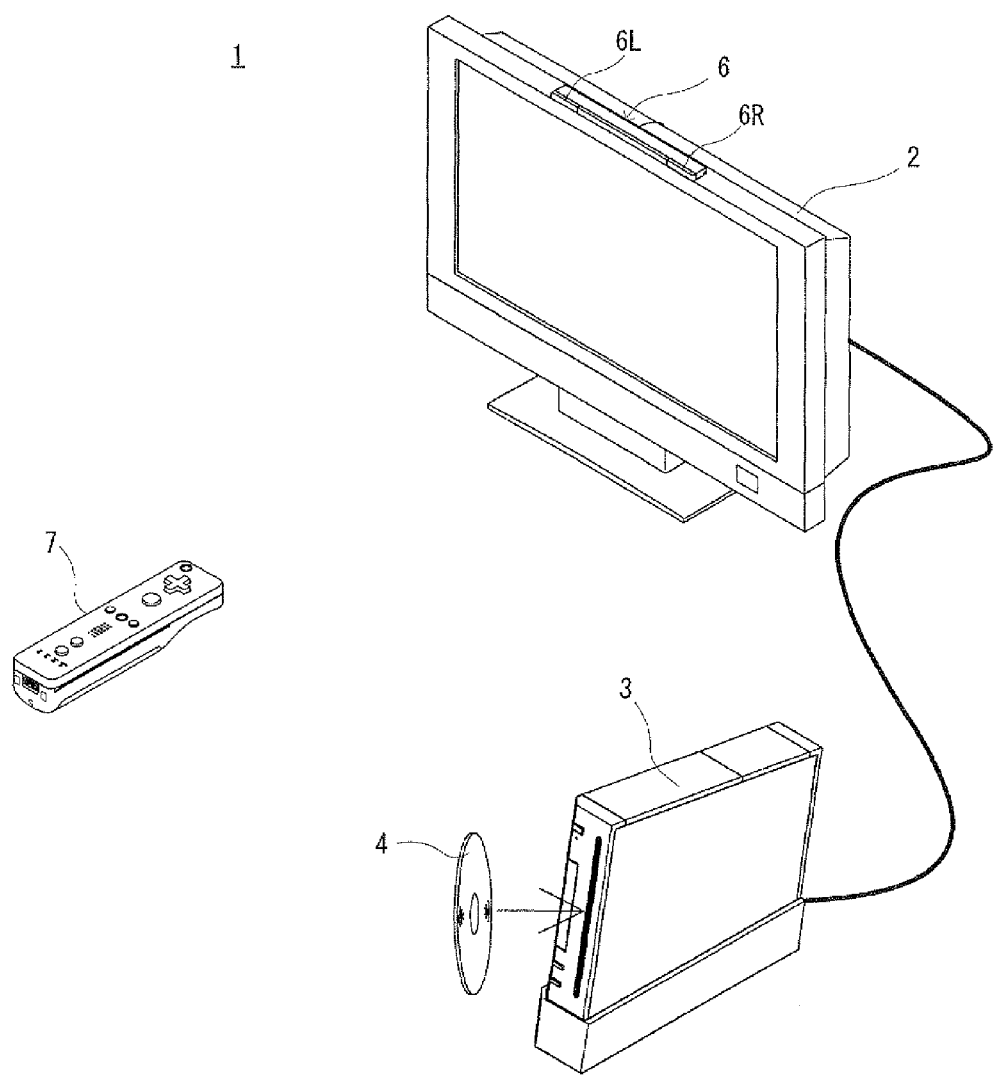
FIG. 1 is an external perspective view of a game system according to an embodiment of the present invention.

Hereinafter, a first embodiment of the present invention will be described with reference to the accompanying drawings. A game system 1 including a game apparatus according to an embodiment of the present invention will be described with reference to FIG. 1. FIG. 1 is an external perspective view of the game system 1. Hereinafter, the game apparatus of this embodiment and a game program will be described, where the game apparatus is a stationary game apparatus as an example.

(Whole Configuration of Game System)

Firstly, an overview of components of the game system 1 will be described. In FIG. 1, the game system 1 includes a liquid crystal television 2, the game apparatus 3, an optical disc 4, a marker unit 6, and a controller 7. In the game system 1, the game apparatus 3 executes a game process based on a game operation using the controller 7.

The optical disc 4, which is an exemplary information storing medium changeable with respect to the game apparatus 3, is detachably loaded into the game apparatus 3. A game program that is executed in the game apparatus 3 is stored on the optical disc 4. On a front surface of the game apparatus 3, a slot through which the optical disc 4 is inserted is provided. The game apparatus 3 executes a game process by reading and executing the game program stored on the optical disc 4 which has been inserted through the slot.

The liquid crystal television 2 is connected via a connection cord to the game apparatus 3. The game apparatus 3 generates a game image showing a behavior of an object in a virtual game space and outputs the game image to the liquid crystal television 2. This series of processes are performed in units of a frame (e.g., at intervals of 1/60 sec) in this embodiment. The liquid crystal television 2 receives and displays a game image that is obtained as a result of the game process executed in the game apparatus 3. The marker unit 6 is provided in the vicinity of the screen of the liquid crystal television 2 (on an upper side of the screen in FIG. 1). The marker unit 6 comprises two markers 6R and 6L at both ends thereof. Specifically, the marker 6R includes one or more infrared LEDs that output infrared light toward the front of the liquid crystal television 2 (the same is true of the marker 6L). The marker unit 6 is connected to the game apparatus 3, so that the game apparatus 3 can control ON/OFF of each infrared LED included in the marker unit 6. The marker unit 6 is also provided with a microphone (not shown). Audio information input through the microphone is input to the game apparatus 3.

The controller 7 is an input device which is operated by a player and inputs to the game apparatus 3 operation data indicating an operation performed with respect to itself. The controller 7 and the game apparatus 3 are connected via wireless communication. In this embodiment, for example, the Bluetooth® technology is used for wireless communication between the controller 7 and the game apparatus 3. Note that, in another embodiment, the controller 7 and the game apparatus 3 may be connected via wired communication.

(Internal Configuration of Game Apparatus 3)

Figure 2:
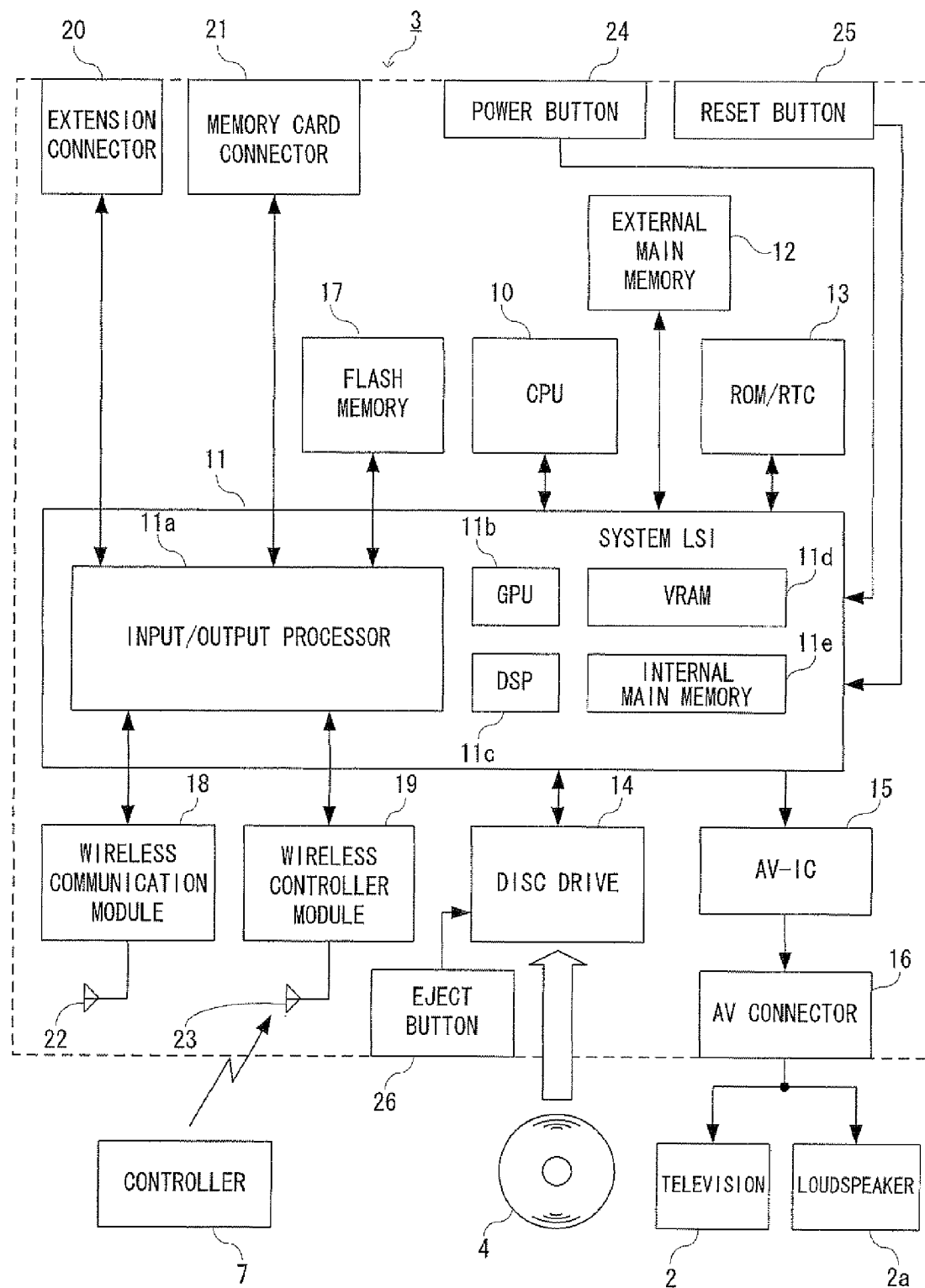
FIG. 2 is a block diagram of a game apparatus.

Next, an internal configuration of the game apparatus 3 will be described with reference to FIG. 2. FIG. 2 is a block diagram showing the configuration of the game apparatus 3. The game apparatus 3 has a CPU 10, a system LSI 11, an external main memory 12, a ROM/RTC 13, a disc drive 14, an AV-IC 15, and the like.

The CPU 10 executes a game program stored on the optical disc 4 to perform a game process, i.e., functions as a game processor. The CPU 10 is connected to the system LSI 11. In addition to the CPU 10, the external main memory 12, the ROM/RTC 13, the disc drive 14, and the AV-IC 15 are connected to the system LSI 11. The system LSI 11 performs processes, such as controlling data transfer between each component connected thereto, generating an image to be displayed, obtaining data from an external apparatus, and the like. An internal configuration of the system LSI 11 will be described below.

The external main memory 12 is a volatile memory. The external main memory 12 stores a program, such as a game program read out from the optical disc 4, a game program read out from a flash memory 17, or the like, or various kinds of data, and is used as a work area, a buffer area or the like for the CPU 10.

The ROM/RTC 13 has a ROM (so-called boot ROM) which stores a program for booting the game apparatus 3, and a clock circuit (RTC: Real Time Clock) which counts time.

The disc drive 14 reads out program data, texture data or the like from the optical disc 4, and writes the read data into an internal main memory 11e (described below) or the external main memory 12.

The system LSI 11 also includes an input/output processor (I/O processor) 11a, a GPU (Graphics Processor Unit) 11b, a DSP (Digital Signal Processor) 11c, a VRAM 11d, and the internal main memory 11e. The components 11a to 11e are connected to each other via an internal bus (not shown).

The GPU 11b, which is a part of a drawing means, generates an image in accordance with a graphics command (image drawing command) from the CPU 10. The VRAM 11d stores data (e.g., polygon data, texture data, etc.) which is required by the GPU 11b to execute the graphics command. When an image is generated, the GPU 11b generates image data using data stored in the VRAM 11d.

The DSP 11c, which functions as an audio processor, generates audio data using sound data, sound waveform (tone color) data or the like stored in the internal main memory 11e, the external main memory 12 or the like.

The image data and audio data thus generated are read out by the AV-IC 15. The AV-IC 15 outputs the read image data via an AV connector 16 to the liquid crystal television 2, and the read audio data to a loudspeaker 2a included in the liquid crystal television 2. Thereby, an image is displayed on the liquid crystal television 2 while a sound is output from the loudspeaker 2a.

The input/output processor 11a executes data transmission and reception between components connected thereto, or downloads data from an external apparatus. The input/output processor 11a is connected to the flash memory 17, a wireless communication module 18, a wireless controller module 19, an extension connector 20, and a memory card connector 21. An antenna 22 is connected to the wireless communication module 18, and an antenna 23 is connected to the wireless controller module 19.

The input/output processor 11a is connected via the wireless communication module 18 and the antenna 22 to a network, and can communicate with other game apparatuses or various servers connected to the network. The input/output processor 11a regularly accesses the flash memory 17 to detect the presence or absence of data that needs to be transmitted to the network. In the case of the presence of the data, the input/output processor 11a transmits the data via the wireless communication module 18 and the antenna 22 to the network. The input/output processor 11a also receives data transmitted from another game apparatus or data downloaded from a download server via the network, the antenna 22, and the wireless communication module 18, and stores the received data into the flash memory 17. The CPU 10 executes a game program to read out the data stored in the flash memory 17 and utilizes the data in the game program. In addition to data communicated between the game apparatus 3 and other game apparatuses or various servers, save data (result data or intermediate data of a game) of a game played using the game apparatus 3 may be stored into the flash memory 17.

The input/output processor 11a also receives operation data transmitted from the controller 7 via the antenna 23 and the wireless controller module 19, and stores (temporarily stores) the operation data into a buffer area of the internal main memory 11e or the external main memory 12.

Also, the extension connector 20 and the memory card connector 21 are connected to the input/output processor 11a. The extension connector 20 is a connector for interface, such as USB or SCSI. When a medium (e.g., an external storage medium, etc.), a peripheral device (e.g., another controller, etc.), or a wired communication connector is connected to the extension connector 20, communication with a network can be performed without using the wireless communication module 18. The memory card connector 21 is a connector for connecting an external storage medium, such as a memory card or the like. For example, the input/output processor 11a can access an external storage medium via the extension connector 20 or the memory card connector 21 to save data or read out data.

The game apparatus 3 is provided with a power button 24, a reset button 25, and an eject button 26. The power button 24 and the reset button 25 are connected to the system LSI 11. When the power button 24 is pressed down, power is supplied via an AC adaptor (not shown) to each component of the game apparatus 3. When the reset button 25 is pressed down, the system LSI 11 reboots the boot program of the game apparatus 3. The eject button 26 is connected to the disc drive 14. When the eject button 26 is pressed down, the optical disc 4 is ejected from the disc drive 14.

(Configuration of Controller 7)

Figure 3:
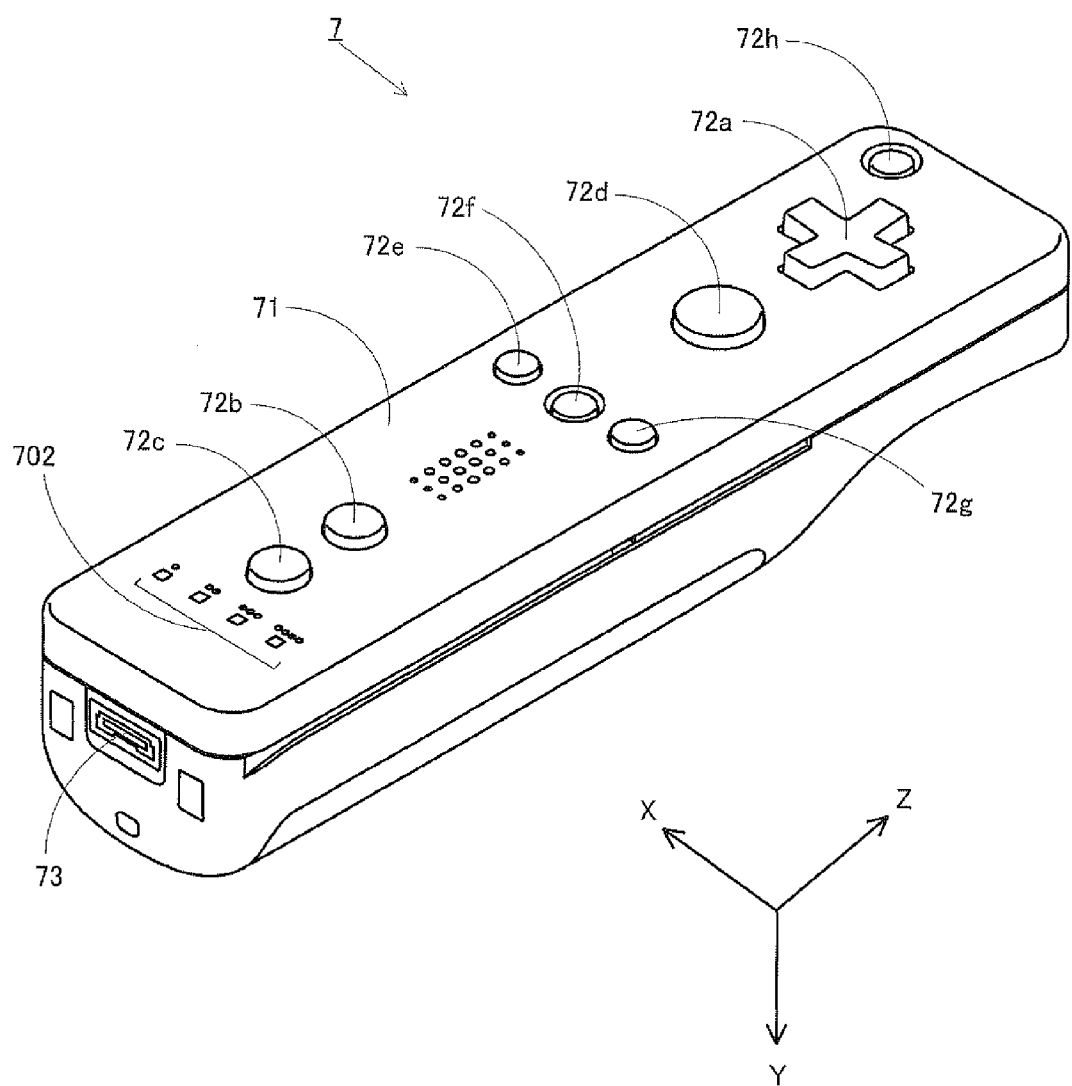
FIG. 3 is a perspective view showing a controller as viewed from the top and the rear.
Figure 4:
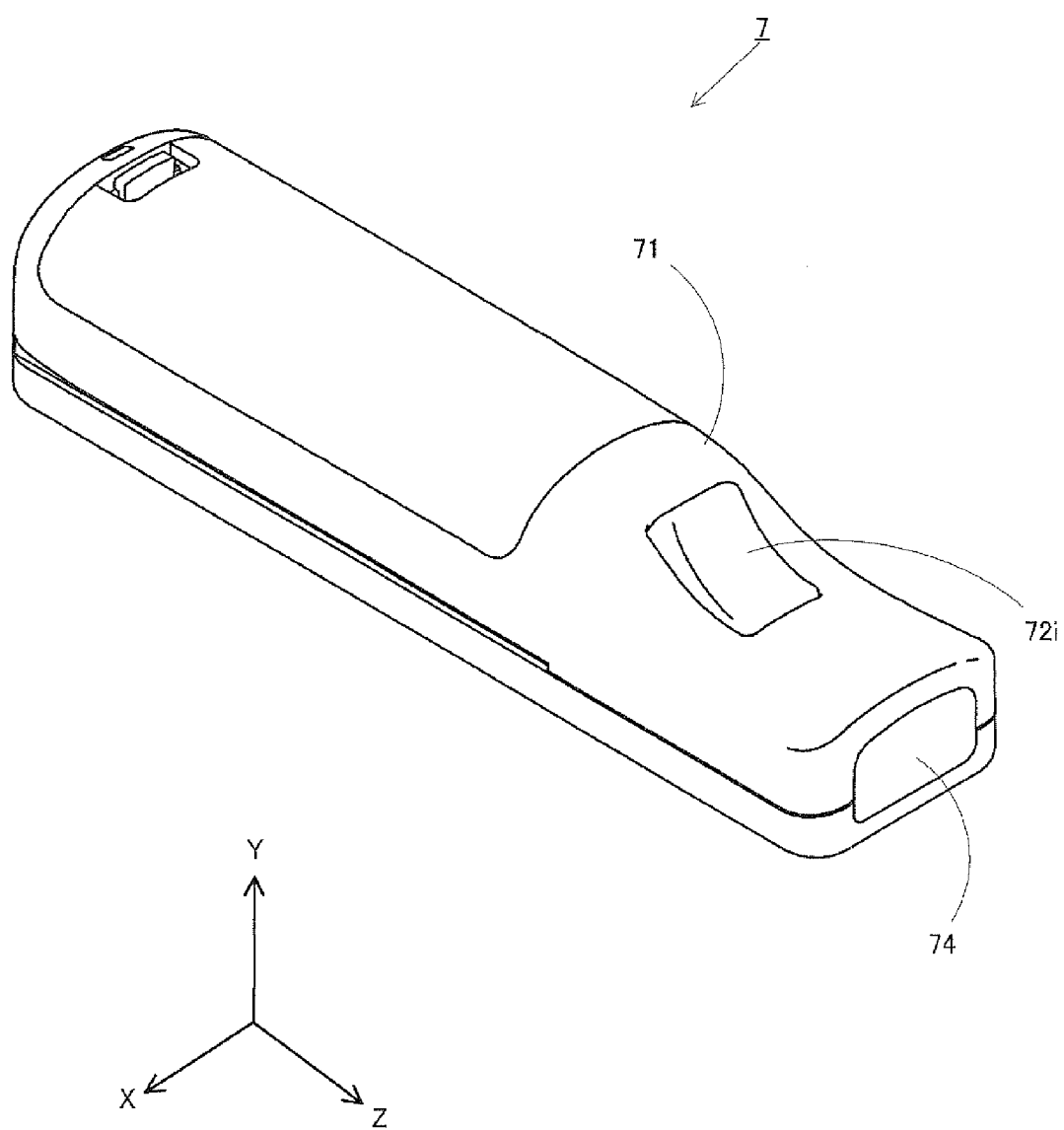
FIG. 4 is a perspective view showing the controller as viewed from the bottom and the front.

The controller 7 will be described with reference to FIGS. 3 and 4. FIG. 3 is a perspective view of the controller 7 as viewed from the top and the rear. FIG. 4 is a perspective view of the controller 7 as viewed from the bottom and the front.

As shown in FIGS. 3 and 4, the controller 7 has a housing 71 formed by, for example, plastic molding, and a plurality of operation portions 72 in the housing 71. The housing 71 is in the shape of substantially a rectangular parallelepiped where a front-to-rear direction thereof is a longitudinal direction thereof. The whole housing 71 has a size which allows an adult and a child to hold the controller 7 with one hand.

A cross key 72a is provided on a central portion closer to a front surface of an upper surface of the housing 71. The cross key 72a is a four-direction push switch in the shape of a cross, and has operation portions corresponding to the respective four directions (frontward, rearward, leftward, and rightward) the operation portions being provided at the respective projecting pieces of the cross which are arranged at intervals of 90°. One of the frontward, rearward, leftward and rightward directions is selected by a player pushing down the corresponding one of the operation portions of the cross key 72a. For example, by a player operating the cross key 72a, a movement direction of a player object or the like appearing in a virtual game world can be specified, or one can be selected and specified from a plurality of options.

Note that the cross key 72a is an operation section which outputs an operation signal, depending on the aforementioned direction input operation by a player, or may be an operation section of other embodiments. For example, an operation section in which four push switches are disposed in cross directions, and an operation signal is output, depending on a push switch pushed down by the player may be provided in the housing 71 instead of the cross key 72a. In addition to the four push switches, a center switch may be provided at an intersection position of the cross directions, i.e., a complex operation section comprising the four push switches and the center switch may be provided. Also, instead of the cross key 72a, an operation section may be provided which outputs an operation signal, depending on a tilt direction of a tiltable stick (so-called joystick) which projects from the upper surface of the housing 71. Also, instead of the cross key 72a, an operation section may be provided which outputs an operation signal, depending on a slide direction of an disc-like member which can be moved in a horizontal direction. Also, a touch pad may be provided instead of the cross key 72a.

A plurality of operation buttons 72b to 72g are provided at the rear of the cross key 72a on the upper surface of the housing 71. The operation buttons 72b to 72g are operation sections which output operation signals assigned to the respective operation buttons 72b to 72g when a player pushes down the head portions of the respective buttons. For example, functions of a 1st button, a 2nd button, an A button and the like are assigned to the operation buttons 72b to 72d. Functions of a minus button, a home button, a plus button and the like are assigned to the operation buttons 72e to 72g. The operation buttons 72a to 72g are assigned the respective functions, depending on a game program executed by the game apparatus 3. Note that, in the exemplary arrangement of FIG. 3, the operation buttons 72b to 72d are aligned on a central portion in a front-to-rear direction of the upper surface of the housing 71. The operation buttons 72e to 72g are aligned in a lateral direction on the upper surface of the housing 71 and between the operation buttons 72b and 72d.

The operation button 72f is a button of a type whose upper surface is buried below the upper surface of the housing 71 so that the player is prevented from unintentionally and erroneously pushing down the button.

Also, an operation button 72h is provided at the front of the cross key 72a on the upper surface of the housing 71. The operation button 72h is a power supply switch which remotely switches ON/OFF a power supply for the game apparatus 3. The operation button 72h is also a button of the type whose upper surface is buried below the upper surface of the housing 71 so that a player is prevented from unintentionally and erroneously pushing down the button.

A plurality of LEDs 702 are provided at the rear of the operation button 72c on the upper surface of the housing 71. Here, the controller 7 is assigned controller identification (number) so as to distinguish it from other controllers 7. For example, the LEDs 702 are used so as to notify a player of the controller identification currently set for the controller 7. Specifically, when transmission data is transmitted from the controller 7 to the game apparatus 3, one of the LEDs 702 is turned ON, depending on the controller identification.

Also, sound holes through which sound is emitted from a loudspeaker (a loudspeaker 706 of FIG. 5) described below to the outside are formed between the operation button 72b and the operation buttons 72e to 72g on the upper surface of the housing 71.

As shown in FIG. 4, a hollow portion is formed on a lower surface of the housing 71. The hollow portion on the lower surface of the housing 71 is formed at a position where the index finger or the middle finger of a player is placed when the player holds the controller 7 with one hand while directing the front surface of the controller 7 toward the markers 6L and 6R. An operation button 72i is provided on a slope surface closer to the rear surface of the hollow portion. The operation button 72i is an operation section which functions as, for example, a B button.

An image capturing device 743 which is a part of the image capture information computing section 74 (see FIG. 7) is provided on a front surface of the housing 71. Here, the image capture information computing section 74 is a system for analyzing image data captured by the controller 7 to determine a place having a high luminance in the image data and detect a center-of-gravity position, a size or the like of the place. The image capture information computing section 74 has, for example, a maximum sampling cycle of about 200 frames/sec, and therefore, can track and analyze a relatively high-speed movement of the controller 7. A detailed structure of the image capture information computing section 74 will be described below. A connector 73 is provided on a rear surface of the housing 71. The connector 73 is, for example, an edge connector which is utilized so as to engage and connect the controller 7 with a connection cable.

Here, in order to specifically describe the present invention, a coordinate system which is set with respect to the controller 7 is defined as follows. As shown in FIGS. 3 and 4, X, Y and Z axes, which are orthogonal to each other, are defined with respect to the controller 7. Specifically, a front-to-rear direction of the controller 7 (the longitudinal direction of the housing 71) is assumed to be the Z axis, and a front surface (a surface on which the image capture information computing section 74 is provided) direction of the controller 7 is assumed to be the positive direction of the Z axis. A vertical direction of the controller 7 is assumed to be the Y axis, and a lower surface (a surface on which the operation button 72i is provided) direction of the housing 71 is assumed to be the positive direction of the Y axis. A lateral direction of the controller 7 is assumed to be the X axis, and a left side surface (a side surface shown in FIG. 4, but not in FIG. 3) direction of the housing 71 is assumed to be the positive direction of the X axis.

Figure 5:
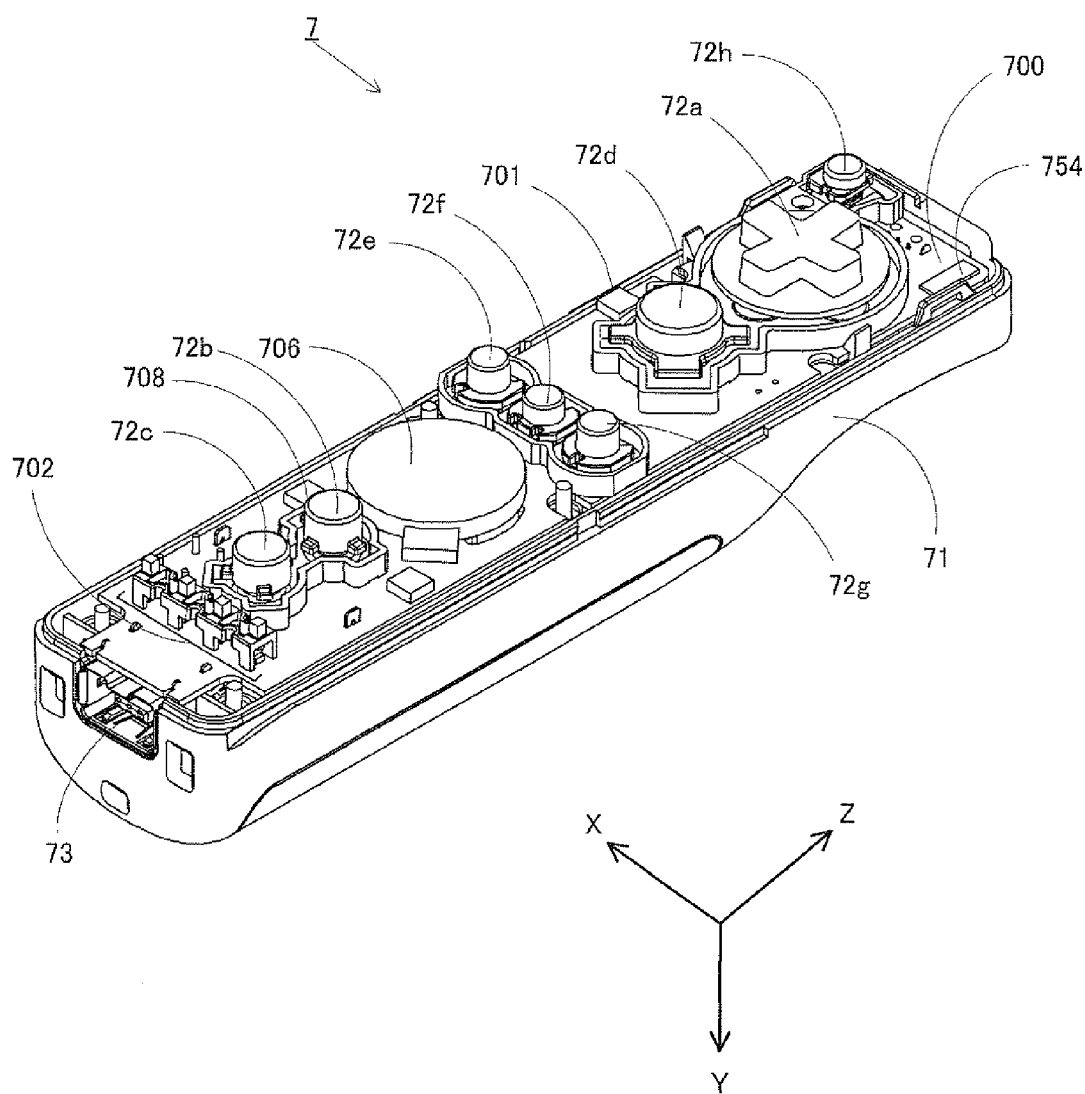
FIG. 5 is a perspective view of the controller when an upper housing thereof is removed.
Figure 6:
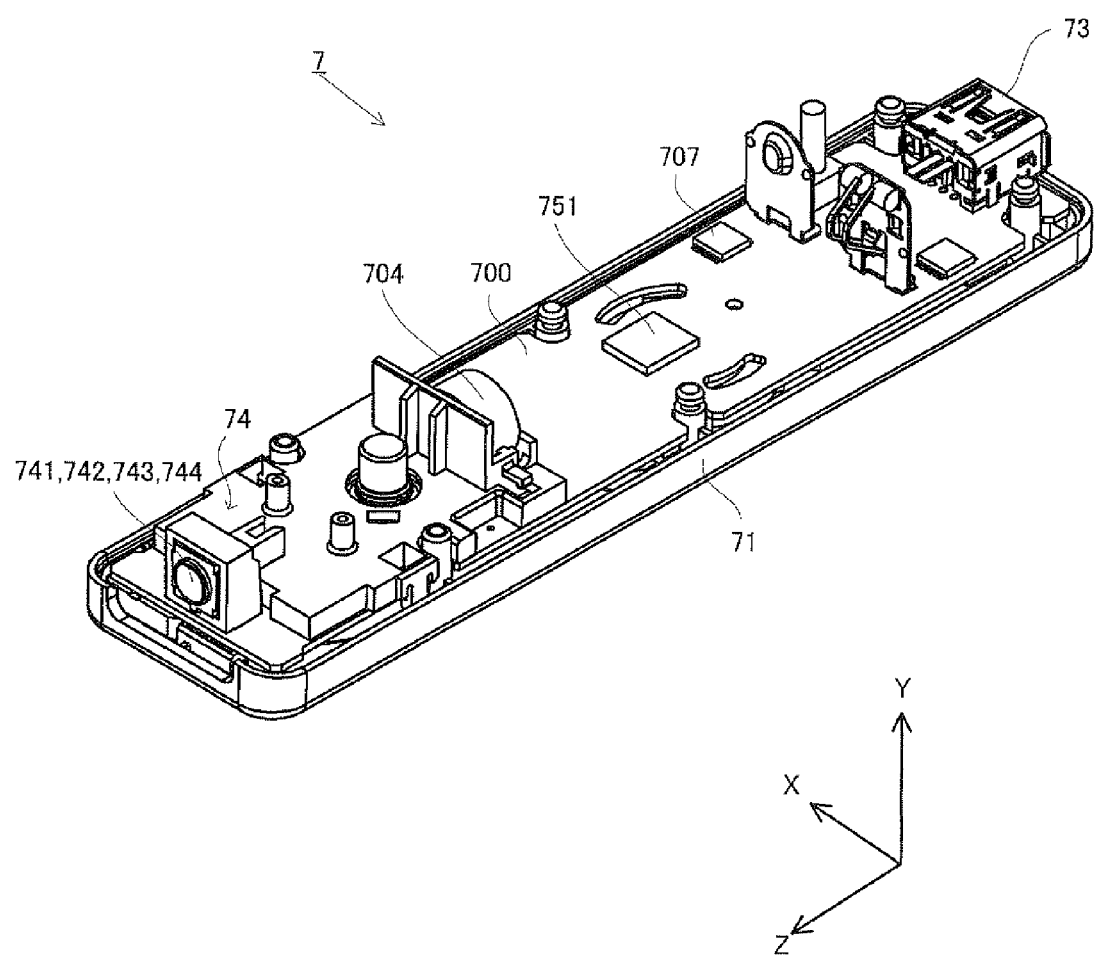
FIG. 6 is a perspective view of the controller when a lower housing thereof is removed.

Next, an internal structure of the controller 7 will be described with reference to FIGS. 5 and 6. Note that FIG. 5 is a perspective view of the controller 7 as viewed from a rear surface side thereof when an upper housing (a portion of the housing 71) is removed. FIG. 6 is a perspective view of the controller 7 as viewed from the front surface side thereof when a lower housing (a portion of the housing 71) is removed. Here, FIG. 6 provides a perspective view of a substrate 700 of FIG. 5 as viewed from a bottom surface thereof.

In FIG. 5, the substrate 700 is fixed inside the housing 71. On an upper major surface of the substrate 700, the operation buttons 72a to 72h, an acceleration sensor 701, the LEDs 702, an antenna 754, and the like are provided. These are connected to a microcomputer 751 and the like (see FIGS. 6 and 7) via conductors (not shown) formed on the substrate 700 and the like. Also, by using a radio module 753 (see FIG. 7) and the antenna 754, the controller 7 functions as a wireless controller. Note that a quartz oscillator (not shown) is provided in the housing 71, and generates a basic clock for the microcomputer 751 (described below). Also, the loudspeaker 706 and an amplifier 708 are provided on the upper major surface of the substrate 700. Also, the acceleration sensor 701 is provided on a left side of the operation button 72d on the substrate 700 (i.e., a peripheral portion of the substrate 700, but not a center portion thereof). Therefore, the acceleration sensor 701 can detect an acceleration including a component due to a centrifugal force as well as a change in direction of a gravitational acceleration, depending on a rotation of the controller 7 around the longitudinal direction as an axis. Therefore, by predetermined computation, the game apparatus 3 or the like can determine the rotation of the controller 7 based on the detected acceleration data with satisfactory sensitivity.

On the other hand, in FIG. 6, the image capture information computing section 74 is provided at a front edge on a lower major surface of the substrate 700. The image capture information computing section 74 comprises an infrared filter 741, a lens 742, the image capturing device 743, and an image processing circuit 744, which are arranged in this order from the front of the controller 7, and are attached to the lower major surface of the substrate 700. The connector 73 is attached to a rear edge on the lower major surface of the substrate 700. Also, a sound IC 707 and the microcomputer 751 are provided on the lower major surface of the substrate 700. The sound IC 707 is connected to the microcomputer 751 and the amplifier 708 via conductors formed on the substrate 700 and the like, and outputs an audio signal via the amplifier 708 to the loudspeaker 706, depending on sound data transmitted from the game apparatus 3.

A vibrator 704 is attached onto the lower major surface of the substrate 700. The vibrator 704 may be, for example, a vibration motor or a solenoid. The vibrator 704 is connected to the microcomputer 751 via a conductor formed on the substrate 700 and the like, and its activation is switched ON/OFF, depending on vibration data transmitted from the game apparatus 3. The activation of the vibrator 704 generates vibration in the controller 7, so that the vibration is transferred to a player's hand holding the controller 7, thereby making it possible to achieve a so-called vibration-feature supporting game. Here, since the vibrator 704 is disposed somehow closer to the front of the housing 71, the housing 71 significantly vibrates while the player is holding the controller 7, so that the player more easily feels vibration.

Next, an internal configuration of the controller 7 will be described with reference to FIG. 7. Note that FIG. 7 is a block diagram showing the configuration of the controller 7.

Figure 7:
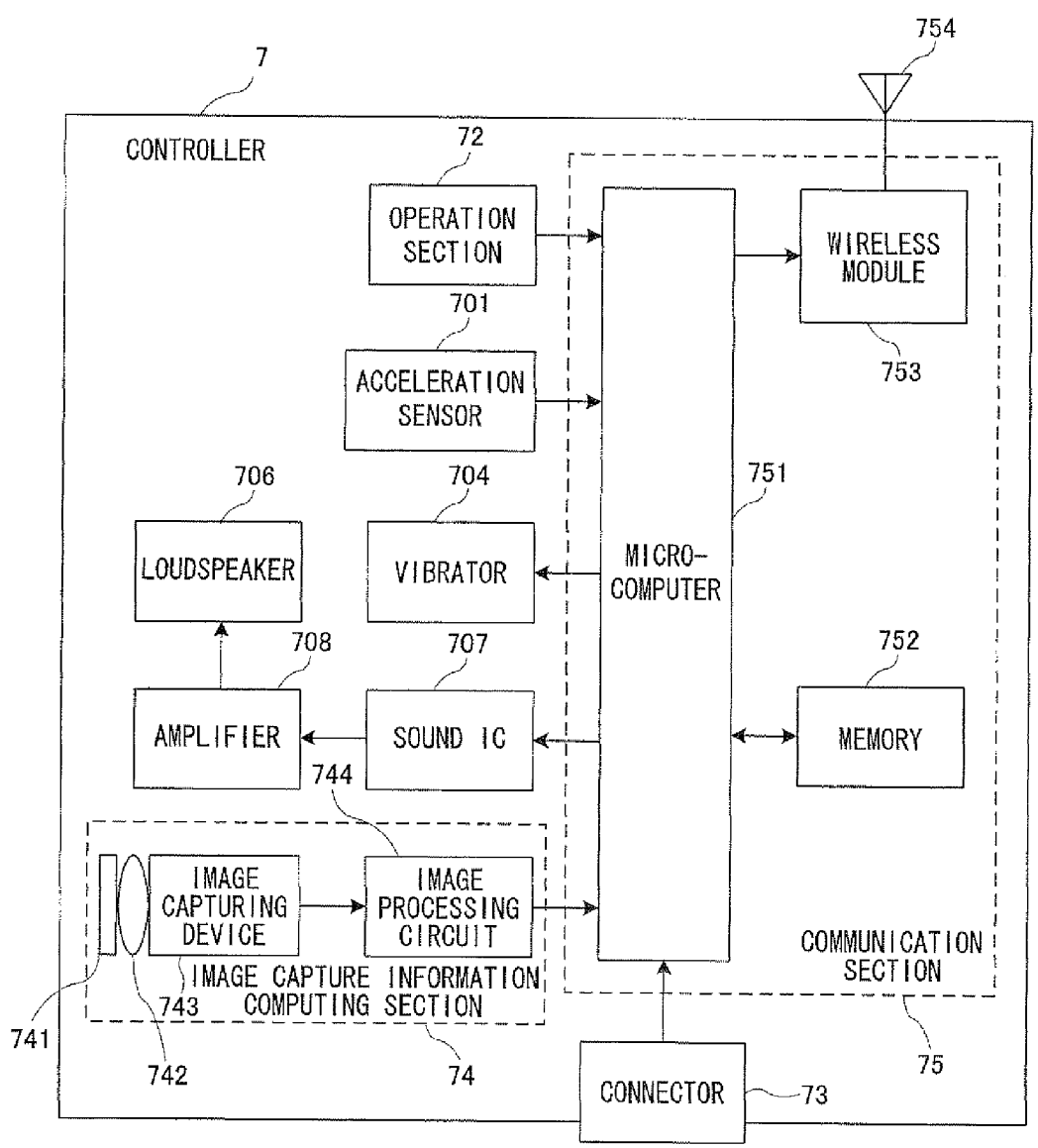
FIG. 7 is a block diagram showing a configuration of the controller.

In FIG. 7, the controller 7 comprises a communication section 75 in addition to the operation section 72, the image capture information computing section 74, the acceleration sensor 701, the vibrator 704, the loudspeaker 706, the sound IC 707, and the amplifier 708.

The image capture information computing section 74 includes the infrared filter 741, the lens 742, the image capturing device 743, and the image processing circuit 744. The infrared filter 741 passes only infrared light entering from the front of the controller 7. The lens 742 collects infrared light passing through the infrared filter 741 and causes the light to enter the image capturing device 743. The image capturing device 743 may be, for example, a solid-state image capturing device, such as a CMOS sensor or a CCD, and captures the infrared light collected by the lens 742. Therefore, the image capturing device 743 captures only infrared light passing through the infrared filter 741 to generate image data. The image data generated by the image capturing device 743 is processed by the image processing circuit 744. Specifically, the image processing circuit 744 processes the image data obtained from the image capturing device 743 to sense high luminance portions, and outputs process result data indicating positional coordinates or areas of the high luminance portions to the communication section 75. Note that the image capture information computing section 74 is fixed to the housing 71 of the controller 7, and therefore, the image capturing direction thereof is changed by changing the direction of the housing 71 itself.

The controller 7 preferably comprises the acceleration sensor 701 which senses accelerations along with three axes (X, Y and Z axes). The three-axis acceleration sensor 701 senses linear accelerations in three directions, i.e., a vertical direction (the Y axis in FIG. 3), a lateral direction (the X axis in FIG. 3), and a front-to-rear direction (the Z axis in FIG. 3).

The communication section 75 comprises the microcomputer 751, the memory 752, the radio module 753, and the antenna 754. The microcomputer 751 controls the radio module 753 for wirelessly transmitting transmission data while using the memory 752 as a memory area during a process. Also, the microcomputer 751 controls operations of the sound IC 707 and the vibrator 704, depending on data from the game apparatus 3 which is received by the radio module 753 via the antenna 754. The sound IC 707 processes sound data or the like transmitted from the game apparatus 3 via the communication section 75. Also, the microcomputer 751 activates the vibrator 704, depending on vibration data (e.g., a signal for switching ON/OFF the vibrator 704) or the like transmitted from the game apparatus 3 via the communication section 75.

An operation signal (key data) from the operation section 72 provided in the controller 7, acceleration signals (X-, Y- and Z-axis direction acceleration data) from the acceleration sensor 701, and process result data from the image capture information computing section 74, are output to the microcomputer 751. The microcomputer 751 temporarily stores the received data (the key data, the X-, Y- and Z-axis direction acceleration data, and the process result data), as transmission data to be transmitted to the wireless communication module 18, into the memory 752. Here, radio transmission from the communication section 75 to the wireless communication module 18 is performed in predetermined cycles. Since a game is generally processed in units of $1/60$ sec, the cycle of the radio transmission needs to be shorter than $1/60$ sec. Specifically, the game processing unit is 16.7 ms ($1/60$ sec), and the transmission interval of the communication section 75 employing Bluetooth® is 5 ms. When timing of transmission to the wireless communication module 18 arrives, the microcomputer 751 outputs transmission data stored in the memory 752, as a series of pieces of operational information, to the radio module 753. Thereafter, the radio module 753 modulates the operational information using a carrier wave having a predetermined frequency and emits the resultant radio signal from the antenna 754, by means of, for example, the Bluetooth® technique. Specifically, the key data from the operation section 72 provided in the controller 7, the X-, Y- and Z-axis direction acceleration data from the acceleration sensor 701, and the process result data from the image capture information computing section 74 are transmitted from the controller 7. Thereafter, the wireless communication module 18 of the game apparatus 3 receives the radio signal, and the game apparatus 3 demodulates or decodes the radio signal, thereby obtaining a series of pieces of operational information (the key data, the X-, Y- and Z-axis direction acceleration data, and the process result data). Thereafter, the CPU 10 of the game apparatus 3 performs a game process based on the obtained operational information and a game program.

Note that the aforementioned hardware configuration is only for illustrative purposes. The configuration of the game apparatus can be appropriately changed as long as the game apparatus is connected to a display device when it is used.

Figure 8:
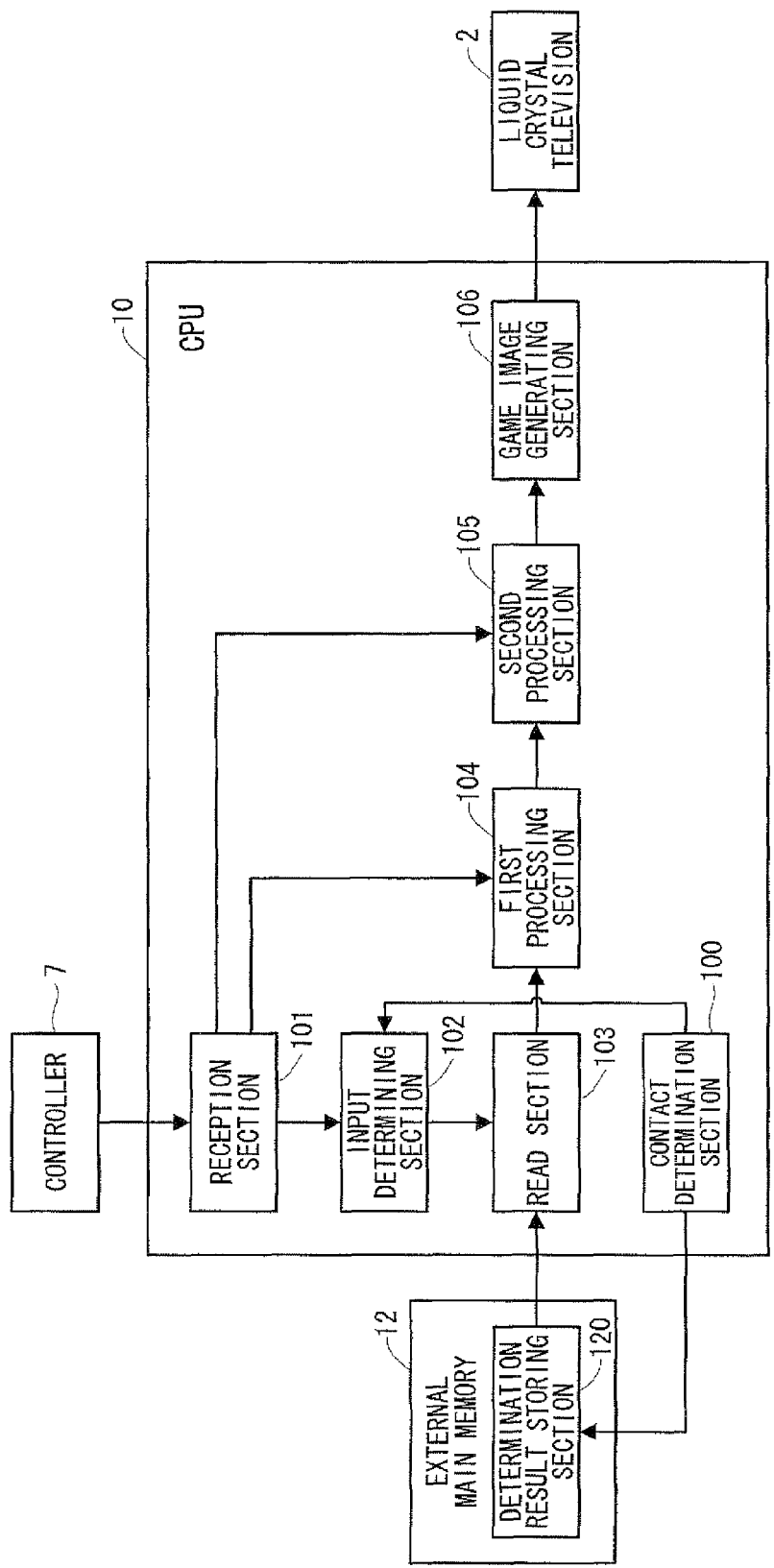
FIG. 8 is a diagram showing a functional configuration of a game apparatus which executes a game program stored in a storage medium according to a first embodiment of the present invention.

FIG. 8 is a diagram showing a functional configuration of the game apparatus 3 which executes a game program stored in a storage medium (optical disc 4) according to the first embodiment of the present invention. As shown in FIG. 8, the CPU 10 of the game apparatus 3 functionally comprises a contact determination section 100, a reception reaction 101, an input determining section 102, a read section 103, a first processing section 104, a second processing section 105, and a game image generating section 106. The external main memory 12 of the game apparatus 3 functionally comprises a determination result storing section 120.

The CPU 10 of the game apparatus 3 executes a game program previously stored on the optical disc 4 or the like to function as functional sections, such as the contact determination section 100, the reception reaction 101, the input determining section 102, the read section 103, the first processing section 104, the second processing section 105, the game image generating section 106 and the like, and to cause the external main memory 12 to function as the determination result storing section 120.

Figure 9A:
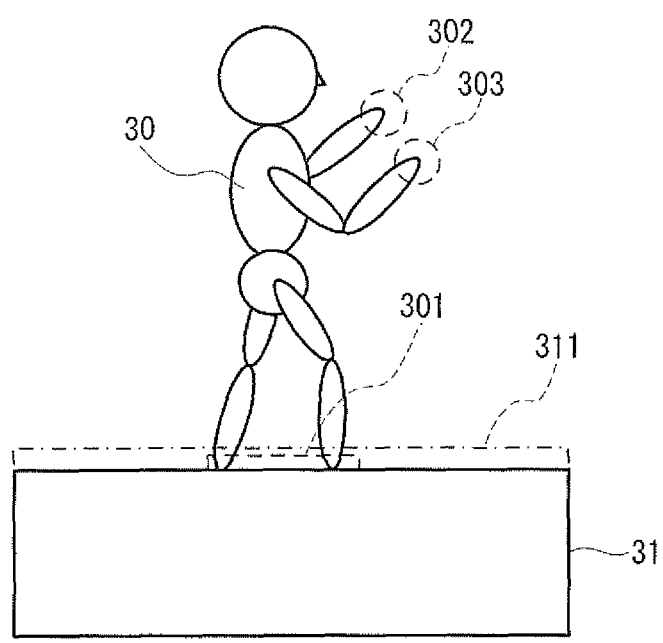
FIGS. 9A and 9B are diagrams showing a game space in which a player object is located on a block.
Figure 9B:
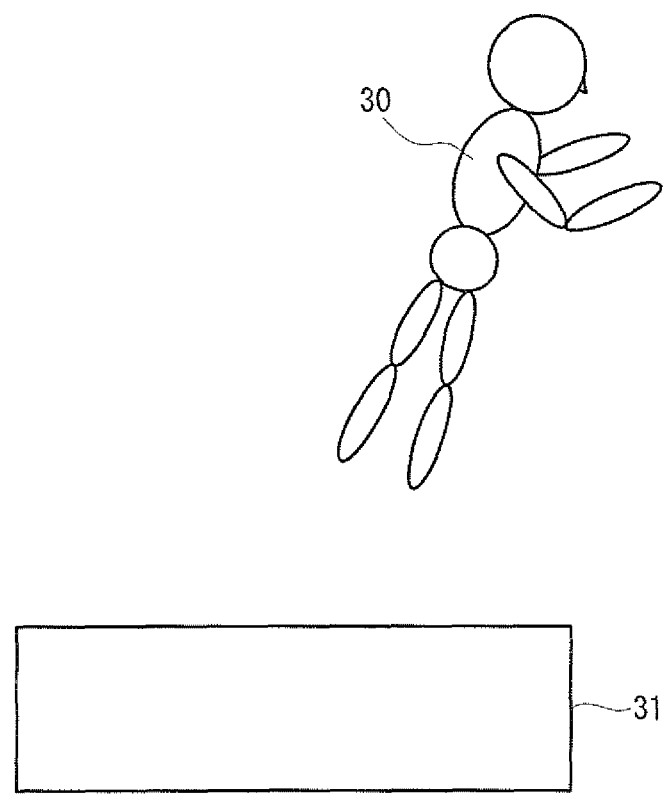

FIGS. 9A and 9B are diagrams showing a game space in which a player object 30 is located on a block 31. FIG. 9A shows a state of the player object 30 standing on the block 31. FIG. 9B shows a state of the player object 30 jumping by kicking the block 31. Hereinafter, each functional section will be described, assuming that the player object 30 (an example of a first object), which is operated in a virtual game space based on an operational input from the controller 7, is caused to jump by kicking the block 31 (an example of a second object), which is an object representing a topographic feature.

The contact determination section 100 repeatedly determines whether or not the player object 30 contacts the block 31. In the game apparatus 3, since a game process is performed in units of $1/60$ sec, the contact determination of the contact determination section 100 is also performed at intervals of 1/60 sec. Hereinafter, a process of the contact determination with respect to the player object 30 and the block 31 will be described.

For the player object 30, a determination area 301 is previously set with respect to a foot portion of the player object 30. When the player object 30 moves in the game space, the determination area 301 moves along with the player object 30. On the other hand, for the block 31, a determination area 311 is previously set with respect to an upper surface portion of the block 31. The determination areas 301 and 311 are virtually set in the game space and are not displayed in a game image. The contact determination section 100 determines whether or not the determination area 301 of the player object 30 contacts the determination area 311 of the block 31. When the contact determination section 100 determines that the determination area 301 contacts the determination area 311, it can be determined that there is a place which the player object 30 kicks to jump. Conversely, when the contact determination section 100 determines that the determination area 301 does not contact the determination area 311, it can be determined that there is no place which the player object 30 kicks to jump. In this kind of games, it may be assumed that the player object 30 jumps by kicking or hitting a wall (not shown) rather than the block 31. In such a case, determination areas 302 and 303 may also be set with respect to hand portions of the player object 30 in addition to the foot portion thereof, and it may be determined whether or not each of the determination area 301, 302 and 303 contacts a determination area set with respect to the wall. Note that the determination of whether or not determination areas contact each other is well known as disclosed in, for example, Japanese Patent Laid-Open Publication No. 2006-318136 and will not be here described in detail.

The determination result storing section 120 successively stores results of determination by the contact determination section 100. In this embodiment, a storage area for storing results of determination corresponding to three consecutive frames is set as the determination result storing section 120 in the external main memory 12. Therefore, the determination result storing section 120 stores three results of determination, i.e., a latest result of determination by the contact determination section 100, an intermediate result of determination one frame before the latest result of determination, and a result of determination two frames before the latest result of determination. Here, the result of determination two frames before is an exemplary result of determination a predetermined period of time before of the present invention. The intermediate result of determination is a result of determination which is stored in the determination result storing section 120 subsequent to the result of determination two frames before and prior to the latest result of determination. Therefore, if the determination result storing section 120 stores results of determination corresponding to four or more frames, the determination result storing section 120 stores a plurality of intermediate results of determination.

In this embodiment, a storage area for storing results of determination corresponding to three frames is previously provided as the determination result storing section 120 in the external main memory 12. Therefore, when three results of determination are already stored in the determination result storing section 120, every time the contact determination section 100 performs new contact determination, the oldest (here, the result of determination two frames before) of the results of determination stored in the determination result storing section 120 is erased to provide an area for storing the new result of determination as a latest result of determination. As described below, when an operational input for causing the player object 30 to jump is performed with respect to the controller 7, the player object 30 is permitted or forbidden to jump by taking into consideration the results of determination stored in the determination result storing section 120.

Note that the predetermined period of time of the present invention is set to have a value corresponding to a delay time between when the execution of contact determination by the contact determination section 100 and the display of a game image showing a game space subjected to the contact determination on the liquid crystal television 2. In this embodiment, the delay time is assumed to be 2/60 sec, and therefore, the predetermined period of time is set to be the same as the delay time, i.e., 2/60 sec. In addition, since the contact determination section 100 performs contact determination at intervals of 1/60 sec, the determination result storing section 120 stores results of determination corresponding to three frames, i.e., from a latest result of determination to a result of determination 2/60 sec (two frames) before the latest result of determination. Note that the predetermined period of time should be set to have an appropriate value, depending on the delay time. For example, when the delay time is assumed to be 4/60 sec, the predetermined period of time may be set to be 4/60 sec, and the determination result storing section 120 may store results of determination corresponding to five frames, i.e., from a latest result of determination to a result of determination 4/60 sec (four frames) before the latest result of determination. Note that if the delay time is not divisible by 1/60 sec, the predetermined period of time may be set to have a value which is closet to the delay time and is divisible by 1/60 sec. For example, if the delay time is 2.8/60 sec, the predetermined period of time may be set to be 3/60 sec. If the delay time is 1.2/60 sec, the predetermined period of time may be set to be 1/60 sec.

As described above, key data from the operation section 72, X-, Y- and Z-axis direction acceleration data from the acceleration sensor 701, and process result data from the image capture information computing section 74 are wirelessly transmitted from the controller 7 to the game apparatus 3. The reception reaction 101 receives these pieces of data wirelessly transmitted from the controller 7 using the wireless communication module 18 and demodulates or decodes the data to obtain operational information. By thus obtaining the operational information, the reception reaction 101 receives from the controller 7 an operational input for operating the player object 30. A result of determination which is to be stored as a latest result of determination in the determination result storing section 120 is one that is obtained at the time when the reception reaction 101 receives an operational input. A result of determination a predetermined period of time before is one that is obtained the predetermined period of time before the reception reaction 101 receives an operational input.

The input determining section 102 determines whether or not an operational input received by the reception reaction 101 is a predetermined operational input. In this embodiment, the input determining section 102 determines whether or not operational information received by the reception reaction 101 contains key data from the operation section 72 for causing the player object 30 to jump. In other words, the input determining section 102 determines whether or not an operational input received by the reception reaction 101 is one for causing the player object 30 to jump (an example of the predetermined operational input).

The read section 103 reads out at least one result of determination including a result of determination two frames before (a predetermined period of time before) from a plurality of (here, three) results of determination stored in the determination result storing section 120, and outputs the at least one result of determination to the first processing section 104. In this embodiment, the read section 103 reads out three results of determination, i.e., a result of determination two frames before, an intermediate result of determination, and a latest result of determination, from the determination result storing section 120, and outputs the three results of determination to the first processing section 104. Note that, in this embodiment, the read section 103 reads out a result of determination when the input determining section 102 determines that an operational input received by the reception reaction 101 is one for causing the player object 30 to jump. In other words, when an operational input received by the reception reaction 101 is not one for causing the player object 30 to jump, the read section 103 does not read out a result of determination.

When a result of determination read out by the read section 103 satisfies predetermined conditions, the first processing section 104 performs a predetermined process with respect to the player object 30. As described above, the read section 103 reads out a result of determination when the input determining section 102 determines that an operational input received by the reception reaction 101 is one for causing the player object 30 to jump. Therefore, the predetermined process is performed when the input determining section 102 determines that an operational input received by the reception reaction 101 is one for causing the player object 30 to jump, and in addition, a result of determination read out by the read section 103 satisfies the predetermined conditions. In this embodiment, the first processing section 104 determines whether or not at least any of the three results of determination read out by the read section 103 indicates that the player object 30 contacts the block 31. If the first processing section 104 determines that any of the three results of determination indicates that the player object contacts the block 31, the first processing section 104 performs, as the predetermined process, a jump process of causing the player object 30 to jump by kicking the block 31.

The second processing section 105 performs another game process which is not performed by the first processing section 104, such as moving in a game space an enemy object or a bullet shot from the enemy object, which are objects other than the player object 30. In other words, the first processing section 104 and the second processing section 105 perform game processes including contact determination.

The game image generating section 106 generates a game image of a game space after the first processing section 104 and the second processing section 105 perform game processes. Specifically, the game image generating section 106 outputs to the GPU 11b information about the results of the game processes performed by the first processing section 104 and the second processing section 105, and in addition, a graphics command. In response to this, the GPU 11b reads out data required to generate a game image from the VRAM 11d and generates the game image. The game image thus generated is output via the AV connector 16 to the liquid crystal television 2 by the AV-IC 15 at intervals of 1/60 sec. Specifically, a series of processes including the contact determination by the contact determination section 100, the game processes by the first processing section 104 and the second processing section 105, and the game image generating process by the game image generating section 106, is performed 60 times per second. The liquid crystal television 2 successively accumulates game images transmitted from the game apparatus 3 into a memory, and performs image processing with respect to the accumulated game images so as to improve the image quality thereof before displaying the game images.

Figure 10:
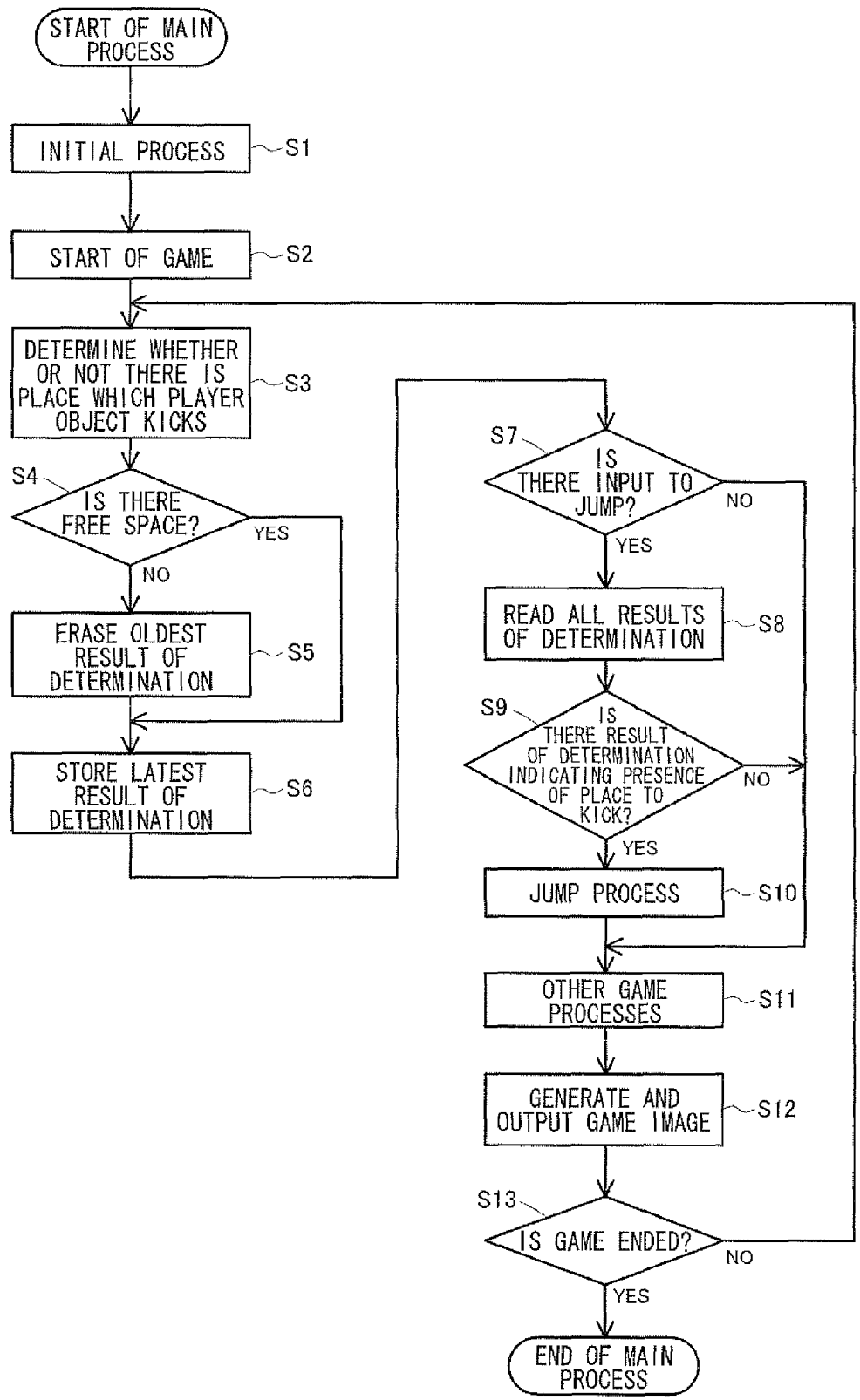
FIG. 10 is a flowchart showing an exemplary process performed in a game apparatus which executes a game program stored in a storage medium according to the first embodiment of the present invention.

Hereinafter, process steps performed in the game apparatus 3 will be described with reference to FIG. 10. FIG. 10 is a flowchart showing an exemplary process performed in the game apparatus 3 which executes a game program stored in a storage medium (optical disc 4) according to the first embodiment of the present invention. Note that the process of the game apparatus 3 described below with reference to the flowchart is performed in accordance with a command which issued by the CPU 10 based the game program stored on the optical disc 4.

When the power button 24 of the game apparatus 3 is pressed down, an initial process is performed in the game apparatus 3 (step S1). Specifically, a game program stored on the optical disc 4 is read out and is stored into the external main memory 12. Thereafter, the CPU 10 constructs a virtual game space and places the player object 30 at a predetermined initial position in the game space. The CPU 10 also generates a game image showing a game space in the vicinity of the player object 30 and displays the game image on the liquid crystal television 2. After a preparation process for initiation of a game is thus performed, the CPU 10 executes the game program in the external main memory 12 to start the game (step S2).

After the start of the game, the contact determination section 100 determines whether or not there is a place to kick at a foot of the player object 30 (step S3). Specifically, the contact determination section 100 determines whether or not the determination area 301 of the player object 30 contacts the determination area 311 of the block 31.

Next, the contact determination section 100 determines whether or not the determination result storing section 120 has a free space for storing a result of determination obtained by the contact determination of step S3 (step S4). Specifically, the contact determination section 100 determines whether or not results of determination corresponding to three frames have already been stored in the determination result storing section 120. The contact determination section 100, when determining that the determination result storing section 120 does not have a free space (step S4: NO), erases the oldest result of determination from the determination result storing section 120 (step S5). Note that, in this embodiment, a result of determination two frames before a latest result of determination is the oldest result of determination, and therefore, in step S5, the result of determination two frames before is erased. On the other hand, if the contact determination section 100 determines that the determination result storing section 120 has a free space (step S4: YES), control proceeds to step S6.

After performing the process of step S5 or if determining that the determination result storing section 120 has a free space (step S4: YES), the contact determination section 100 stores the result of determination obtained by the contact determination of step S3 as a latest result of determination into the determination result storing section 120 (step S6).

If the latest result of determination is stored into the determination result storing section 120 by the process of step S6, the input determining section 102 determines whether or not an operational input for causing the player object 30 to jump has been performed with respect to the controller 7, based on operational information obtained by the reception reaction 101 (step S7). If the input determining section 102 determines that an operational input for causing the player object 30 to jump has not been performed (step S7: NO), control proceeds to step S11 described below.

If the input determining section 102 determines that an operational input for causing the player object 30 to jump has been performed (step S7: YES), the read section 103 reads out all results of determination from the determination result storing section 120 (step S8). Specifically, the input determining section 102 reads out a latest result of determination, a result of determination one frame before, and a result of determination two frames before, from the determination result storing section 120.

The first processing section 104 determines whether or not at least any of the results of determination corresponding to three consecutive frames read out by the read section 103 indicates that there is a place to kick at a foot of the player object 30 (step S9). Here, the first processing section 104 determines whether or not at least any of the results of determination corresponding to three frames read out by the read section 103 indicates that the determination area 301 contacts the determination area 311. If the first processing section 104 determines that none of the results of determination corresponding to three frames read out by the read section 103 indicates that the determination area 301 contacts the determination area 311 (step S9: NO), control proceeds to step S11.

If the first processing section 104 determines that at least any of the results of determination corresponding to three frames read out by the read section 103 indicates that the determination area 301 contacts the determination area 311 (step S9: YES), the first processing section 104 performs a jump process of causing the player object 30 to jump by kicking the block 31 (step S10). In this case, if the operational information obtained by the reception reaction 101 contains key data specifying a movement direction of the player object 30 in addition to key data for causing the player object 30 to jump, the first processing section 104 causes the player object 30 to jump in the direction indicated by the key data. Thus, the first processing section 104, when at least one result of determination indicates that the player object 30 contacts the block 31, performs the jump process with respect to the player object 30.

If the jump process of step S10 has been performed, the result of determination in step S7 is negative, or the result of determination in step S9 is negative, the second processing section 105 performs another game process (step S11). Specifically, the second processing section 105 performs a game process of moving an object appearing in a game space other than the player object 30, such as an enemy object, a bullet shot from the enemy object or the like (an example of the second object of the present invention). Note that, when the process of step S11 is performed after the result of determination in step S7 is negative or after the result of determination in step S9 is negative, then if operational information obtained by the reception reaction 101 contains key data specifying a movement direction of the player object 30, a process of moving the player object 30, depending on the key data, is performed in step S11.

If the other game process of step S11 has been performed, the game image generating section 106 generates a game image showing a game space after the game process of step S11 and outputs the game image to the liquid crystal television 2 (step S12).

After the game image is output, it is determined whether or not the game is to be ended (step S13). Specifically, it is determined whether or not operational information obtained from the controller 7 contains data instructing to end the game. If the operational information obtained from the controller 7 contains data instructing to end the game (step S13: YES), the game is ended. On the other hand, if the operational information obtained from the controller 7 does not contain data instructing to end the game (step S13: NO), control returns to step S3. Thereafter, a series of the processes of steps S3 to S13 is performed for each frame (60 times per second) until it is determined in step S13 that the game is to be ended.

As described above, according to the first embodiment of the present invention, it is decided whether or not a jump process for the player object 30 is to be permitted, taking into consideration a result of determination two frames before (a predetermined period of time before). This predetermined period of time (here, two frames) is set to correspond to a delay time between the execution of contact determination and the display of a game image showing a game space subjected to the contact determination on the liquid crystal television 2 as described above. Therefore, the state of a game space indicated by a game image on the liquid crystal television 2 viewed by a player matches the state of a game space subjected to contact determination in the game apparatus 3. In other words, when it is decided whether or not a jump process for the player object 30 is to be permitted, a result of contact determination with respect to a game space indicated by a game image which a player is viewing (a result of determination two frames before) is taken into consideration. Therefore, it is possible to prevent a game process performed as a result of contact determination from being illogical for a player. For example, it is possible to prevent a problem that whereas a player recognizes that the player object 30 contacts the block 31 and thinks that the player object 30 can be caused to jump, and performs an operational input for causing the player object 30 to jump, the player object 30 cannot be actually caused to jump.

Some display devices which are connected to the game apparatus 3 have substantially no delay between the execution of contact determination and the display of a game image showing a game space subjected to the contact determination. In such a case, if only a result of determination two frames before is taken into consideration, a result of determination corresponding to a game space shown by a game image which a player is viewing (here, a latest result of determination) is not taken into consideration. In this embodiment, in view of the presence and absence of such a delay, both a result of determination two frames before and a latest result of determination are taken into consideration. In other words, a result of determination with respect to a game space shown by a game image which a player is viewing is taken into consideration irrespective of the presence or absence of a delay, whereby a game process natural for a player can be performed.

Also, in this embodiment, when a player operates the controller 7, it is determined whether or not the player object 30 is to be caused to jump, taking into consideration a result of determination a predetermined period of time before and an intermediate result of determination in addition to a latest result of determination. If these conditions are satisfied, it is permitted to cause the player object 30 to jump. Therefore, a game process natural for the player can be performed with timing natural for the player.

Also, in this embodiment, if at least one result of determination indicates that the player object 30 contacts the block 31, a process of causing the player object 30 to jump is permitted. Therefore, as compared to a case where only a result of determination two frames before is taken into consideration or a case where only a latest result of determination is taken into consideration, it is easier to cause the player object 30 to jump. In other words, it is possible not only to prevent a game process from being illogical for a player, but also to reduce the difficulty of a game.

Note that it has been assumed in this embodiment that it is decided whether or not a jump process for the player object 30 is to be permitted, based on three results of determination, i.e., a result of determination two frames before, an intermediate result of determination, and a latest result of determination. Instead of this, a jump process for the player object 30 may be performed when at least one of two results of determination, i.e., a result of determination two frames before (a predetermined period of time before) and a latest result of determination, indicates that the player object 30 contacts the block 31. Therefore, in this case, an intermediate result of determination is not taken into consideration, resulting in a reduction in processing load of the CPU 10.

Also, although it has been assumed in this embodiment that the second object of the present invention is the block 31 which is an exemplary object representing a topographic feature, the second object may be other objects. The second object may be, for example, an enemy object which causes damage to the player object 30, or a bullet, a missile, laser or the like shot from the enemy object. In such a case, the first processing section 104 performs a damage process of causing damage to the player object 30 as the predetermined process instead of a jump process. In the constitution of the first embodiment, if at least any of results of determination stored in the determination result storing section 120 indicates that the player object 30 contacts the second object, damage is caused to the player object 30. Therefore, as is opposite to the case where a jump process is performed as the predetermined process, the difficulty of a game can be increased. Specifically, the difficulty of a game can be adjusted, depending on the game process which is performed by the first processing section 104. Note that, if the difficulty of a game is increased, it is likely that a game process illogical for a player is performed. Therefore, it is desirable that damage be caused to the player object 30 under conditions that all results of determination read out from the determination result storing section 120 indicate that the player object 30 contacts the second object. Therefore, in this case, for example, if at least any of the results of determination corresponding to three frames indicates that the player object 30 does not contact the second object, damage is not caused to the player object 30, whereby the difficulty of a game can be reduced.

Also, although it has been assumed in this embodiment that the player object 30 is the first object of the present invention and the block 31 is the second object of the present invention, the first and second objects are not limited to those. For example, the first object may be an enemy object and the second object may be a player object. In such a case, when the player object is in an invincible state in which the player object is not damaged even if being attacked by the enemy object, then if at least any of the results of determination read out by the read section 103 indicates that the player object contacts the enemy object, a damage process is performed with respect to the enemy object. Therefore, a game process more advantageous to the player can be performed.

Also, although it has been assumed in this embodiment that the display device of the present invention is the liquid crystal television 2, the display device is not limited to the liquid crystal television 2 and may be a monitor for a personal computer, a projector, a plasma television or the like. These display devices are likely to have a delay as in the liquid crystal television 2.

Second Embodiment

Hereinafter, a second embodiment of the present invention will be described. Although it has been assumed in the first embodiment that the predetermined period of time is 2/60 sec, the predetermined period of time is desirably changed as required, depending on a delay time between the execution of contact determination and the display of a game image showing a game space subjected to the contact determination. Specifically, when a display device having a longer delay time is connected to the game apparatus 3, the predetermined period of time is desirably set to be, for example, 4/60 sec rather than 2/60 sec. Therefore, in the second embodiment, a case where the predetermined period of time is set to have an optimal value, depending on the type of a display device connected to the game apparatus 3, will be described.

Figure 11:
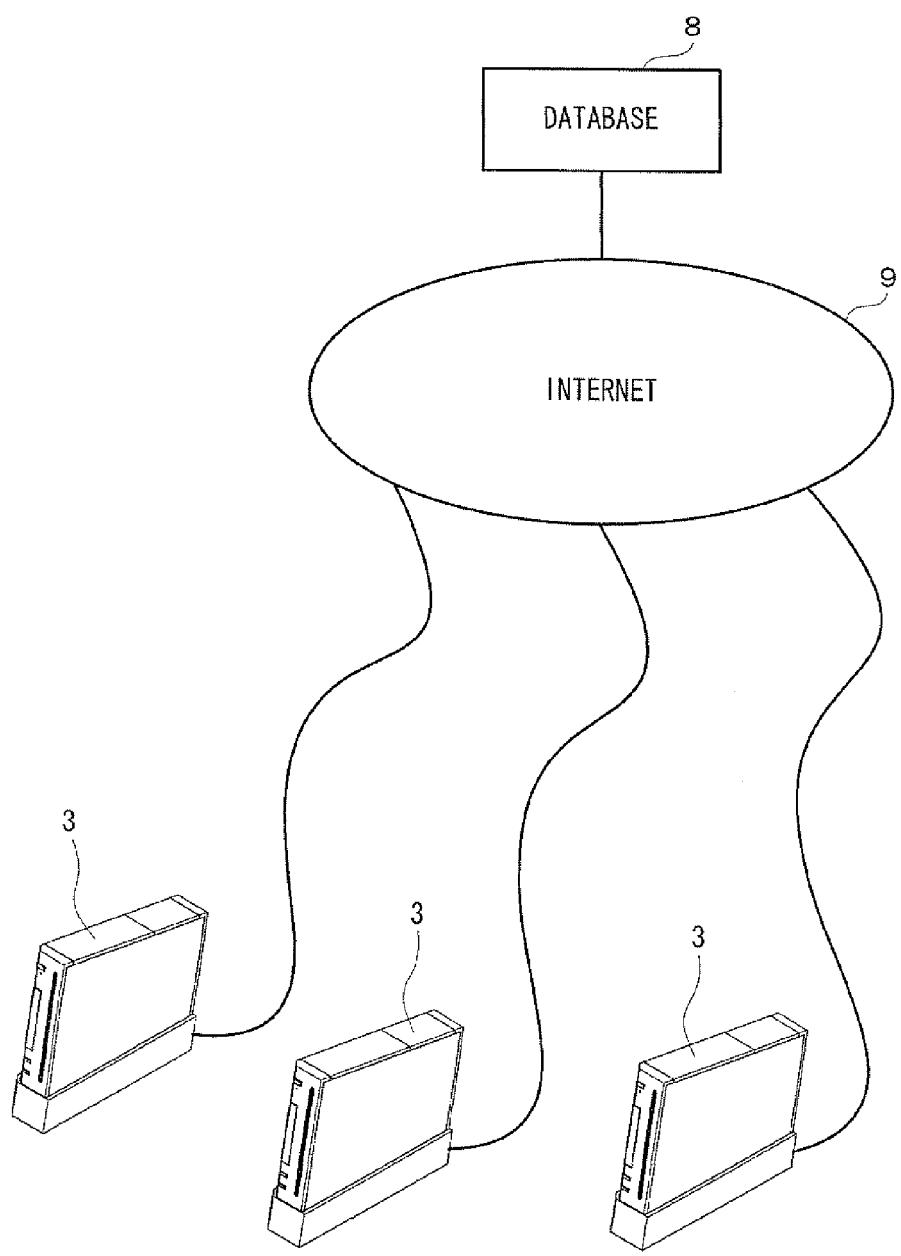
FIG. 11 is a diagram showing a configuration in which a game apparatus is communicably connected via the Internet to a database.

FIG. 11 is a diagram showing a configuration in which a game apparatus 3 is communicably connected via the Internet 9 to a database 8. The game apparatus 3 of the second embodiment has a configuration similar to that of the first embodiment, except that the game apparatus 3 is communicably connected via the Internet 9 to the database 8, and that the game apparatus 3 includes some different functional sections. Therefore, in the second embodiment, the same components as those of the first embodiment are indicated by the same reference symbols and will not be described. Different points will be described.

As shown in FIG. 11, the game apparatus 3 is communicably connected via the Internet 9 to the database 8. The database 8 stores model numbers of display devices in association with their delay times. Here, the delay time is a time lag between the execution of a game process including contact determination in the game apparatus 3 and the display of a game image showing a game space subjected to the game process on the display device. Thus, the database 8 stores identification information (here, the model numbers of display devices) for identifying the display devices in association with their delay times. Note that the identification information for identifying the display devices is not limited to the model numbers of the display devices, and may be the names, manufacturers or the like of the display devices.

Figure 12:
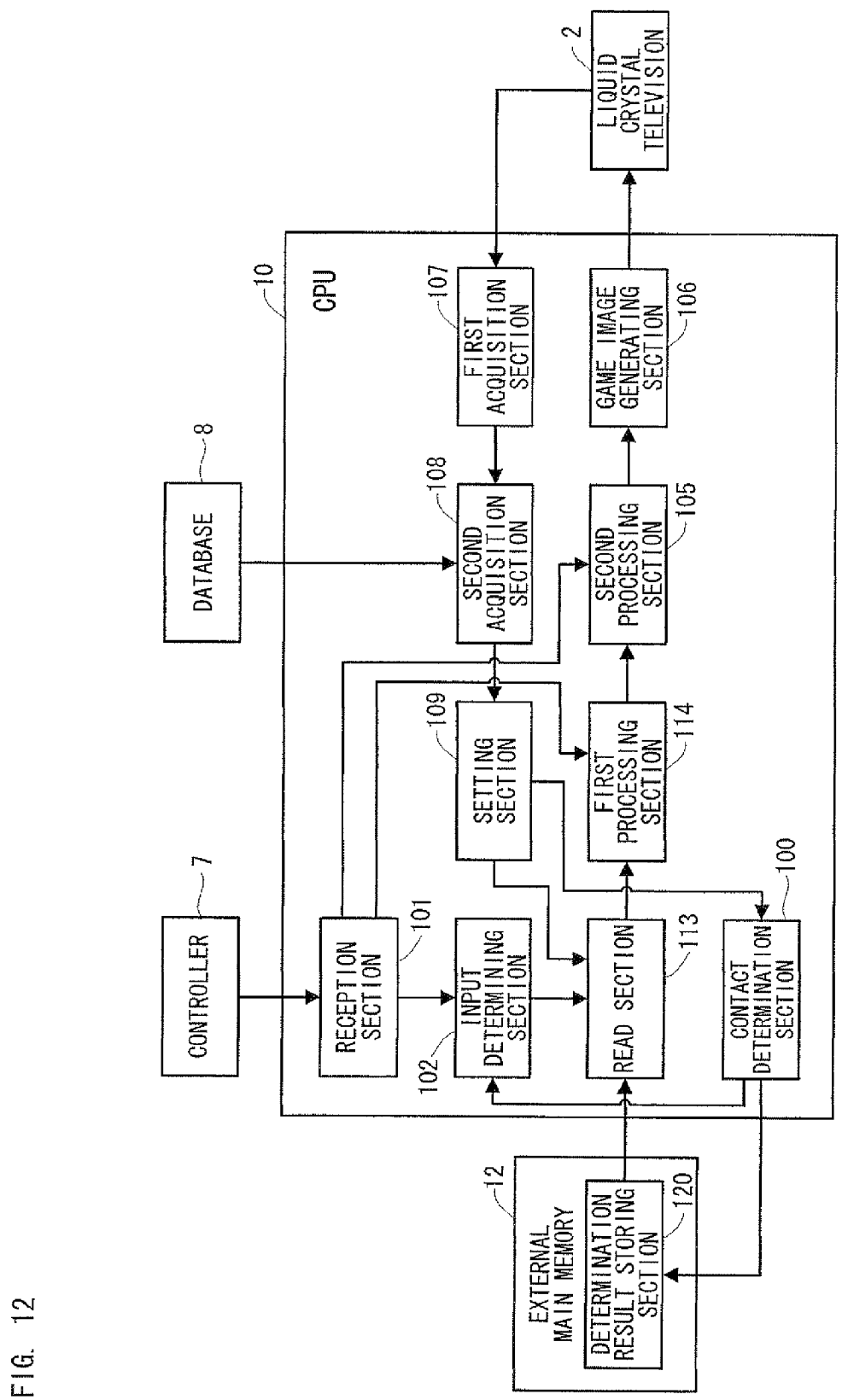
FIG. 12 is a diagram showing an exemplary functional configuration of a game apparatus which executes a game program stored in a storage medium according to a second embodiment of the present invention.

FIG. 12 is a diagram showing an exemplary functional configuration of the game apparatus 3 which executes a game program stored in a storage medium according to the second embodiment. As shown in FIG. 12, a CPU 10 of the game apparatus 3 functionally comprises, as in the first embodiment, a contact determination section 100, a reception reaction 101, an input determining section 102, a second processing section 105, and a game image generating section 106. Also, the CPU 10 functionally comprises a read section 113 and a first processing section 114 instead of the read section 103 and the first processing section 104, and further comprises a first acquisition section 107, a second acquisition section 108, and a setting section 109.

The first acquisition section 107 acquires identification information of a display device to which the game apparatus 3 is connected. Specifically, the first acquisition section 107 transmits, to the display device to which the game apparatus 3 is connected, a command to request the identification information of the display device. By receiving the identification information returned from the display device in response to the command, the first acquisition section 107 acquires the identification information of the display device. Note that, for example, the first acquisition section 107 may cause the display device to which the game apparatus 3 is connected to display a list of identification information of display devices, and identification information selected by a player's operational input to the controller 7 may be acquired as the identification information of the display device.

The second acquisition section 108 acquires, from the database 8, a delay time corresponding to the identification information acquired by the first acquisition section 107. Specifically, the second acquisition section 108 accesses the database 8 via the Internet 9 and receives, from the database 8, a delay time associated with the same identification information as that acquired by the first acquisition section 107.

The setting section 109 sets a predetermined period of time based on the delay time acquired by the second acquisition section 108. Specifically, the setting section 109 changes the number of results of determination stored in the determination result storing section 120 by changing the size of the storage area used as the determination result storing section 120 of the external main memory 12. For example, when the delay time acquired by the second acquisition section 108 is 3/60 sec, the predetermined period of time is decided as 3/60 sec, and the size of the storage area used as the determination result storing section 120 is changed so as to store results of determination corresponding to four frames, i.e., from a latest result of determination to a result of determination three frames before the latest result of determination. Alternatively, for example, when the delay time acquired by the second acquisition section 108 is 1/60 sec, the predetermined period of time is decided as 1/60 sec, and the size of the storage area used as the determination result storing section 120 is changed so as to store results of determination corresponding to two frames, i.e., from a latest result of determination to a result of determination one frame before the latest result of determination.

The read section 113 functions in a manner similar to that of the read section 103 of the first embodiment, except that only a result of determination the predetermined period of time before is read out from the determination result storing section 120. Thus, in the second embodiment, only a result of determination the predetermined period of time before is read out from the determination result storing section 120, and therefore, the first processing section 114 takes into consideration only the result of determination the predetermined period of time before when a jump process is performed. Note that the first processing section 114 functions in a manner similar to that of the first processing section 104 of the first embodiment, except that not all results of determination stored in the determination result storing section 120 are taken into consideration.

Figure 13:
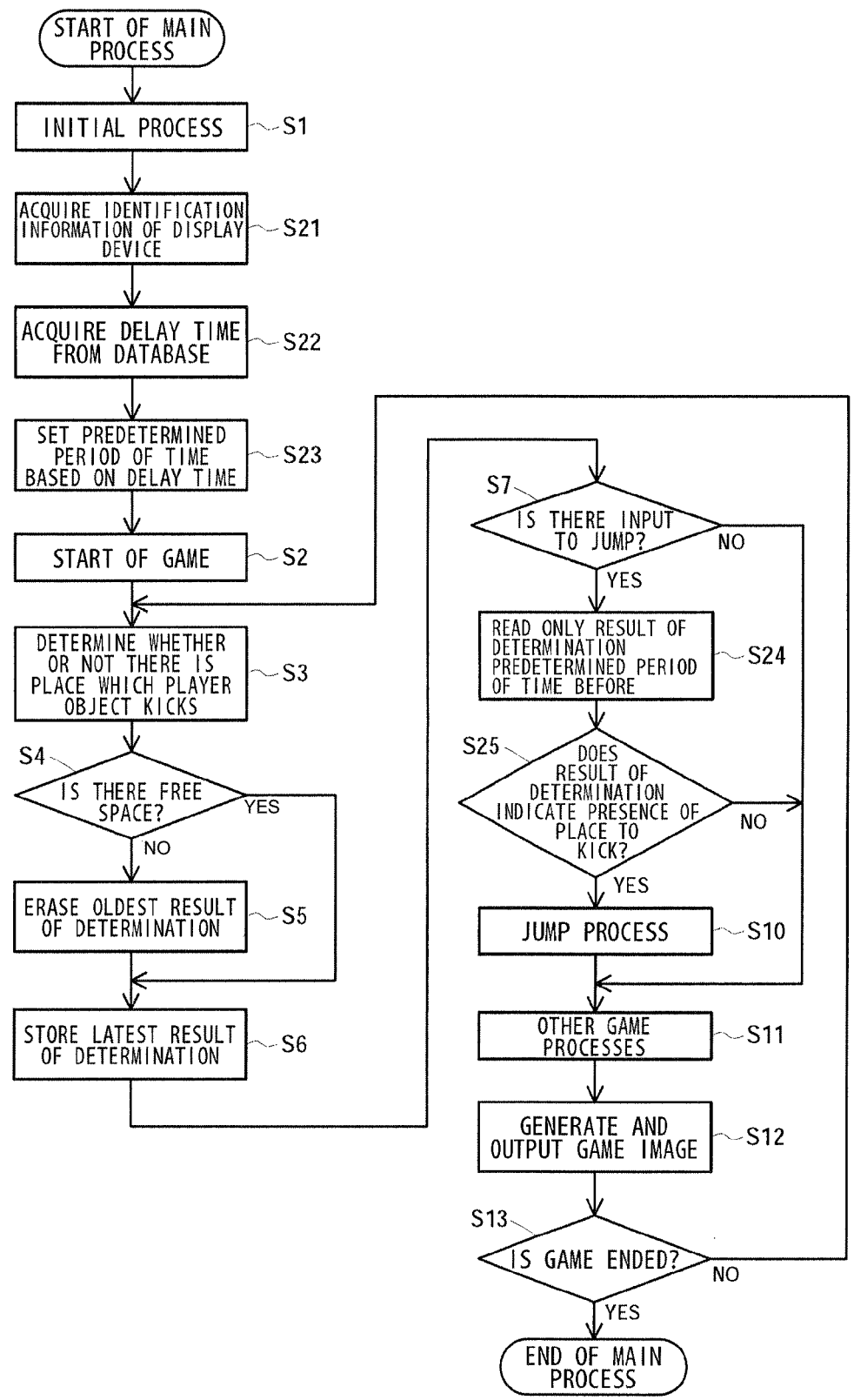
FIG. 13 is a flowchart showing an exemplary process performed by the game apparatus which executes the game program stored in the storage medium of the second embodiment of the present invention.

Hereinafter, process steps performed by the game apparatus 3 will be described with reference to FIG. 13. FIG. 13 is a flowchart showing an exemplary process performed in the game apparatus 3 which executes a game program stored in a storage medium according to a second embodiment of the present invention. Note that the process steps of FIG. 13 include the same process steps as those of FIG. 10, which are indicated by the same step numbers and will not be described.

After the initial process of step S1 is completed, the first acquisition section 107 acquires identification information from the liquid crystal television 2 (step S21). Specifically, the first acquisition section 107 outputs a command to request transmission of identification information to the liquid crystal television 2, and receives identification information returned from the liquid crystal television 2. When receiving the identification information, the second acquisition section 108 accesses the database 8 and acquires from the database 8 a delay time corresponding to the identification information acquired by the first acquisition section 107 (step S22).

After the second acquisition section 108 acquires the delay time, the setting section 109 sets the predetermined period of time based on the delay time (step S23). Specifically, the setting section 109 decides the predetermined period of time as a period of time corresponding to the delay time, and divides the decided predetermined period of time by a time interval in which contact determination is performed, thereby calculating the number of frames corresponding to the predetermined period of time. For example, when the predetermined period of time is 4/60 sec and the time interval is 1/60 sec, the number of frames is calculated as "4." The setting section 109 changes the size of the storage area used as the determination result storing section 120 so that a result of determination the calculated number of frames before is the oldest result of determination. After the predetermined period of time is thus set, control proceeds to step S2.

In step S7, when the input determining section 102 determines that an operational input for causing the player object 30 to jump has been performed with respect to the controller 7 (step S7: YES), the read section 113 reads out only a result of determination the predetermined period of time (changed by the process of step S23) before from the determination result storing section 120 (step S24). In this embodiment, the read section 113 reads only a result of determination four frames before from the determination result storing section 120. The first processing section 114 determines whether or not the result of determination read out by the read section 113 indicates that there is a place to kick at a foot of the player object 30 (step S25). By the process of step S25, it is decided whether or not the jump process of step S10 is to be performed.

Note that, in the process of step S24, as is different from the process of step S8 in the first embodiment, only a result of determination the predetermined period of time before is read out from the determination result storing section 120. This is because a time lag between the execution of a game process including contact determination and the display of a game image showing the result of the game process is obvious from the delay time acquired in step S22, and a latest result of determination and an intermediate result of determination do not necessarily need to be taken into consideration.

As described above, according to the second embodiment of the present invention, the predetermined period of time of the present invention is set to have a value optimal to a display device connected to the game apparatus 3, thereby making it possible to more effectively prevent a game process performed, depending on the result of contact determination with respect to objects, from being illogical for a player. Moreover, the first processing section 114 takes only a single result of determination into consideration when it is decided whether or not a jump process is to be performed, resulting in a reduction in processing load of the CPU 10 as compared to the first embodiment.

Although it has been assumed in this embodiment that the delay times of display devices are stored in the database 8, performance information indicating performance (e.g., a data processing rate) of the display devices may be stored in the database 8 in association with the identification information of display devices. In this case, in the game apparatus 3, the second acquisition section 108 may acquire from the database 8 performance information corresponding to a display device to which the game apparatus 3 is connected, calculate a delay time from the acquired performance information by a predetermined calculation process, and set the calculated delay time as the predetermined period of time.

Also, although it has been assumed in this embodiment that the network of the present invention is the Internet 9, the network may be other networks, such as a LAN (Local Area Network), a WAN (Wide Area Network), and the like.

Also, the second acquisition section 108 may be caused to function as a delay time receiving means for receiving from the controller 7 an input of the delay time of a display device to which the game apparatus 3 is connected, while the setting section 109 may be caused to function as a setting means for setting the predetermined period of time based on the delay time received by the second acquisition section 108. As a result, an effect similar to the second embodiment can be obtained without adding to the game system an environment in which the database 8 or the Internet 9 is connected. Note that, in this case, the first acquisition section 107 is not required.

Third Embodiment

Hereinafter, a third embodiment of the present invention will be described. As described above, a player can control a behavior of the player object 30 (see FIGS. 9A and 9B) by operating the controller 7. However, the player's sensation of operating the controller 7 does not necessarily match a result of a game process which is performed, depending on an operational input with respect to the controller 7. Therefore, when the player object 30 is moved at high speed, there may be an error between a position of the player object 30 visually recognized by a player and an actual position of the player object 30, so that a game process which is not intended by the player may be performed. For example, there is a case where, although the player recognizes that the player object 30 is not dropping off the block 31, the player object 30 is actually dropping off the block 31. In the third embodiment, only when the player object 30 is moved at high speed, a process of reducing the aforementioned error in a game process is performed.

The game apparatus of the third embodiment has a configuration similar to that of the game apparatus 3 of the first embodiment, except for a portion of the functional configuration of the game apparatus. Therefore, in the third embodiment, the same components as those of the game apparatus 3 of the first embodiment are indicated by the same reference symbols and will not be described. Different points will be described.

Figure 14:
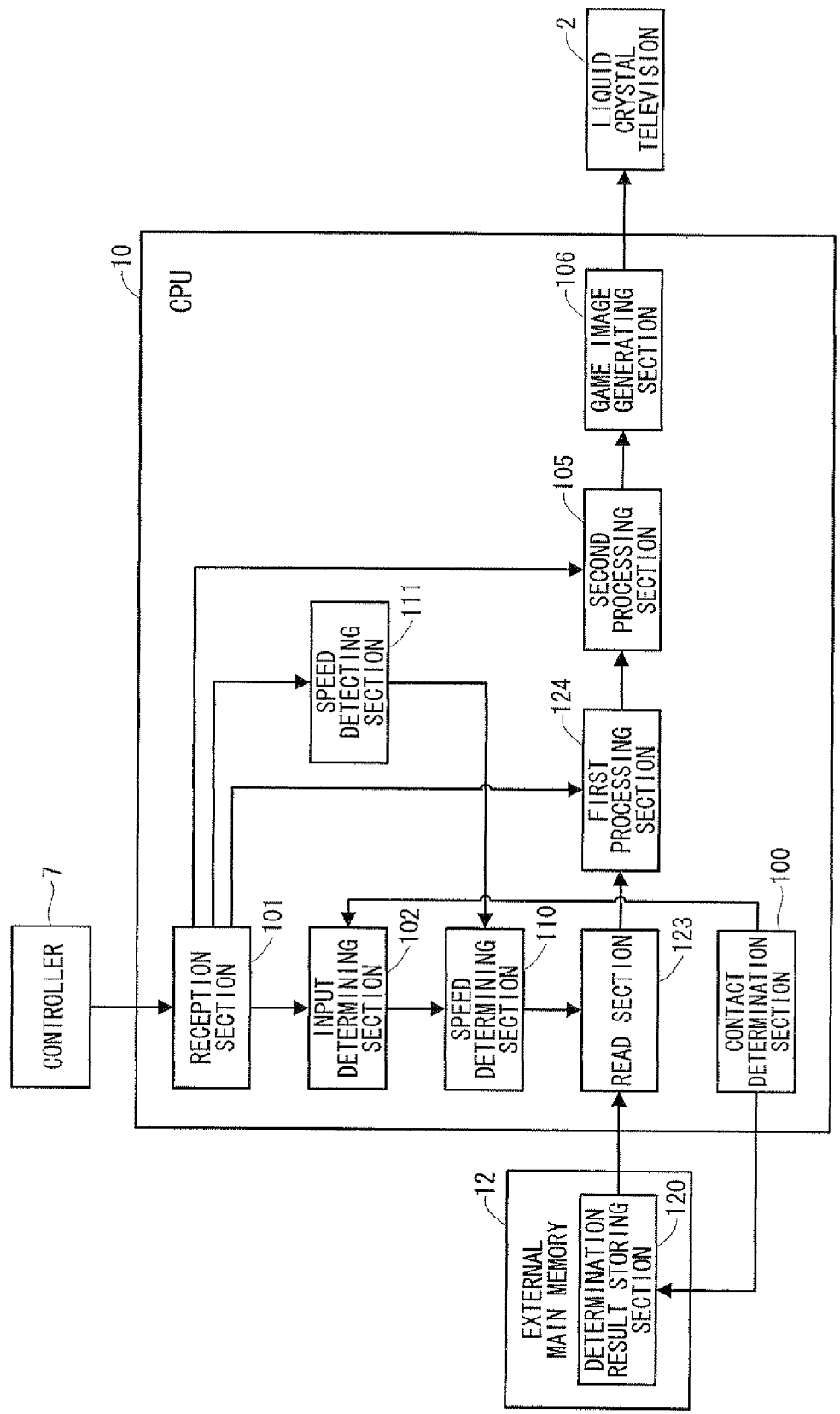
FIG. 14 is a diagram showing an exemplary functional configuration of a game apparatus which executes a game program stored in a storage medium according to a third embodiment of the present invention.

FIG. 14 is a diagram showing an exemplary functional configuration of the game apparatus 3 which executes a game program stored in a storage medium according to the third embodiment. As shown in FIG. 14, a CPU 10 of the game apparatus 3 functionally comprises, as in the first embodiment, a contact determination section 100, a reception reaction 101, an input determining section 102, a second processing section 105, and a game image generating section 106. Also, the CPU 10 functionally comprises a read section 123 and a first processing section 124 instead of the read section 103 and the first processing section 104, and further comprises a speed detecting section 111 and a speed determining section 110.

The speed detecting section 111 detects a moving speed of the player object 30. Specifically, the speed detecting section 111 calculates and detects the moving speed of the player object 30 based on the operational information obtained by the reception reaction 101.

The speed determining section 110 determines whether or not the moving speed of the player object 30 detected by the speed detecting section 111 is a predetermined speed or higher. Specifically, the speed determining section 110 calculates the moving speed of the player object 30 based on operational information transmitted from the controller 7, and determines whether or not the calculated speed is the predetermined speed or higher. When the speed determining section 110 determines that the moving speed of the player object 30 is the predetermined speed or higher, the read section 123 reads out all results of determination from the determination result storing section 120. Also, when the speed determining section 110 determines that the moving speed of the player object 30 is lower than the predetermined speed, the read section 123 reads out only a latest result of determination from the determination result storing section 120. Thus, the read section 123 changes results of determination which are to be read out from the determination result storing section 120, depending on the result of determination by the speed determining section 110, which is different from the read section 103 of the first embodiment. The first processing section 124, when deciding whether or not a jump process is to be performed, may take into consideration either all results of determination stored in the determination result storing section 120 or only a latest result of determination, depending on the result of determination by the speed determining section 110, which is different from the first processing section 104 in the first embodiment.

Figure 15:
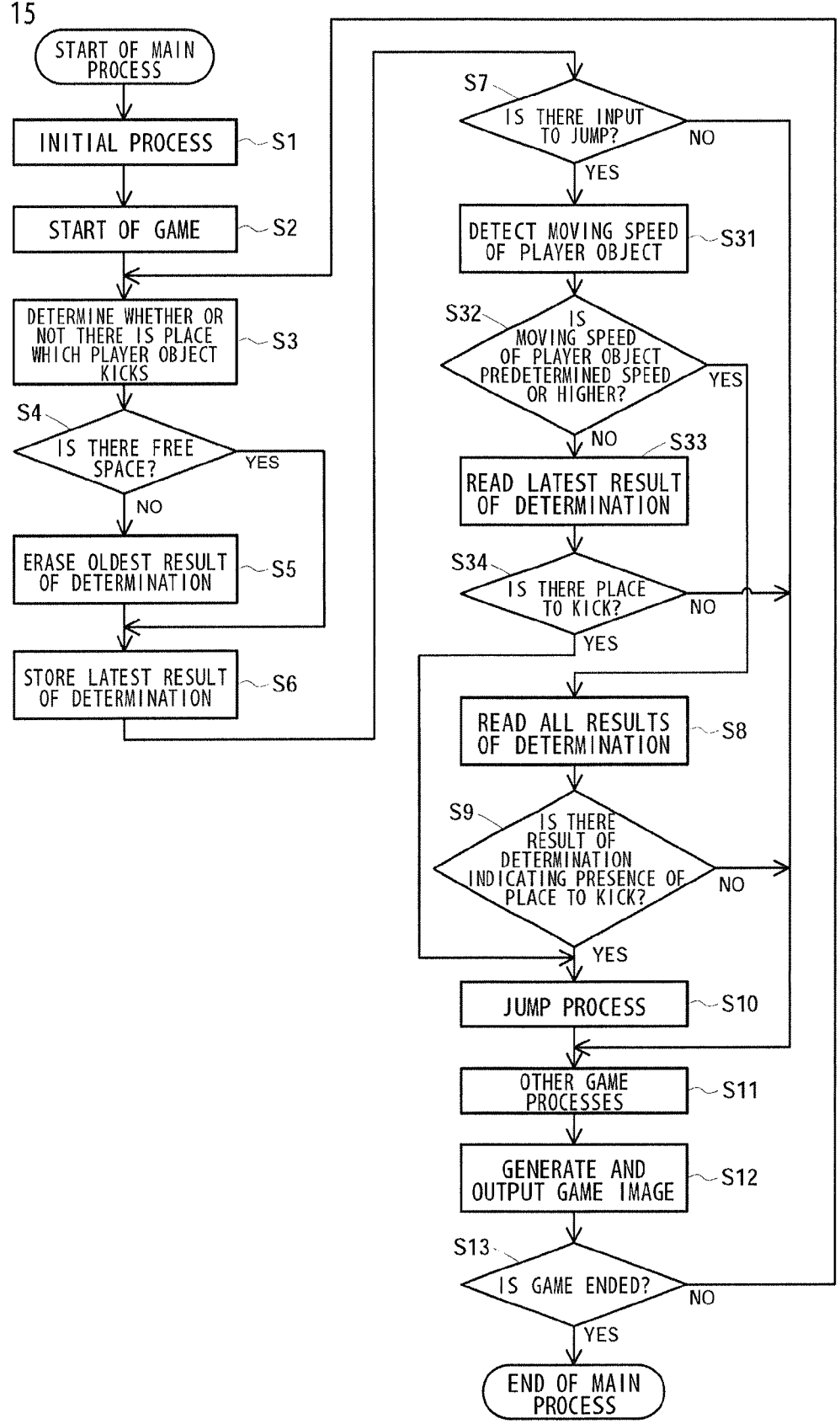
FIG. 15 is a flowchart showing an exemplary process performed by the game apparatus which executes the game program stored in the storage medium of the third embodiment of the present invention.

Hereinafter, process steps performed in the game apparatus 3 will be described with reference to FIG. 15. FIG. 15 is a flowchart showing an exemplary process performed in the game apparatus 3 which executes a game program stored in a storage medium according to the third embodiment of the present invention. Note that the process steps of FIG. 15 include the same process steps as those of FIG. 10, which are indicated by the same step numbers and will not be described.

When the input determining section 102 determines that an operational input for causing the player object 30 to jump has been performed with respect to the controller 7 (step S7: YES), the speed detecting section 111 detects the moving speed of the player object 30 based on operational information obtained by the reception reaction 101 (step S31). In response to this, the speed determining section 110 determines whether or not the moving speed of the player object 30 detected by the speed detecting section 111 is the predetermined speed or higher (step S32). When the speed determining section 110 determines that the moving speed of the player object 30 is lower than the predetermined speed (step S32: NO), the read section 123 reads out only a latest result of determination from the determination result storing section 120 (step S33). Thereafter, the first processing section 124 determines whether or not the latest result of determination read out by the process of step S33 indicates that there is a place to kick at a foot of the player object 30 (step S34). When the latest result of determination indicates that there is a place to kick at a foot of the player object 30 (step S34: YES), the first processing section 124 performs the jump process of step S10. Conversely, when the latest result of determination indicates that there is not a place to kick at a foot of the player object 30 (step S34: NO), control proceeds to step S11.

When the speed determining section 110 determines that the moving speed of the player object 30 is the predetermined speed or higher (step S32: YES), the read section 123 reads out all results of determination from the determination result storing section 120 (step S8). In response to this, the first processing section 124 determines whether or not at least any of the results of determination corresponding to three consecutive frames read out by the read section 123 indicates that there is a place to kick at a foot of the player object 30 (step S9). When the result of determination by the first processing section 124 is positive, the jump process of step S10 is performed. Thus, the first processing section 124 performs the jump process only when the speed determining section 110 determines that the moving speed of a player object is a predetermined speed or higher and at least one result of determination indicates that there is a place to kick.

As described above, according to the third embodiment of the present invention, when the moving speed of the player object 30 is lower than the predetermined speed, it is considered that there is substantially no error between a position of the player object 30 visually recognized by a player and an actual position of the player object 30, and therefore, it is decided whether or not the jump process is to be performed, taking only a latest result of determination into consideration. Conversely, when the moving speed of the player object 30 is the predetermined speed or higher, it is considered that there is an error between the position of the player object 30 visually recognized by a player and the actual position of the player object 30, and therefore, it is decided whether or not the jump process is to be performed, taking into consideration a result of determination a predetermined period of time before in addition to a latest result of determination. In other words, when the player object 30 is moved at high speed, a result of determination (a predetermined period of time before) with respect to a game space shown by a game image visually recognized by a player who is viewing the player object 30 is taken into consideration. Therefore, the influence of the error on a game process performed in the game apparatus 3 can be reduced.

Note that it has been assumed in this embodiment that, when it is determined that the moving speed of the player object 30 is the predetermined speed or higher, all results of determination stored in the determination result storing section 120 are read out as in the first embodiment. Alternatively, the read section 123 may be adapted to read out only a result of determination a predetermined period of time before.

Fourth Embodiment

Hereinafter, a fourth embodiment of the present invention will be described. As described in the third embodiment, when the player object 30 is moved at high speed, it is considered that there is an error between a position of the player object 30 visually recognized by a player and an actual position of the player object 30. It is considered that this error increases with an increase in the moving speed of the player object 30. Therefore, in the fourth embodiment, a case will be described where, in order to more effectively remove the influence of the error on a game process performed in the game apparatus 3, the predetermined period of time of the present invention is changed during a game based on the moving speed of the player object 30.

The game apparatus of the fourth embodiment has a configuration similar to that of the game apparatus 3 of the first embodiment, except for a portion of the functional configuration of the game apparatus. Therefore, in the fourth embodiment, the same components as those of the game apparatus 3 of the first embodiment are indicated by the same reference symbols and will not be described. Different points will be described.

Figure 16:
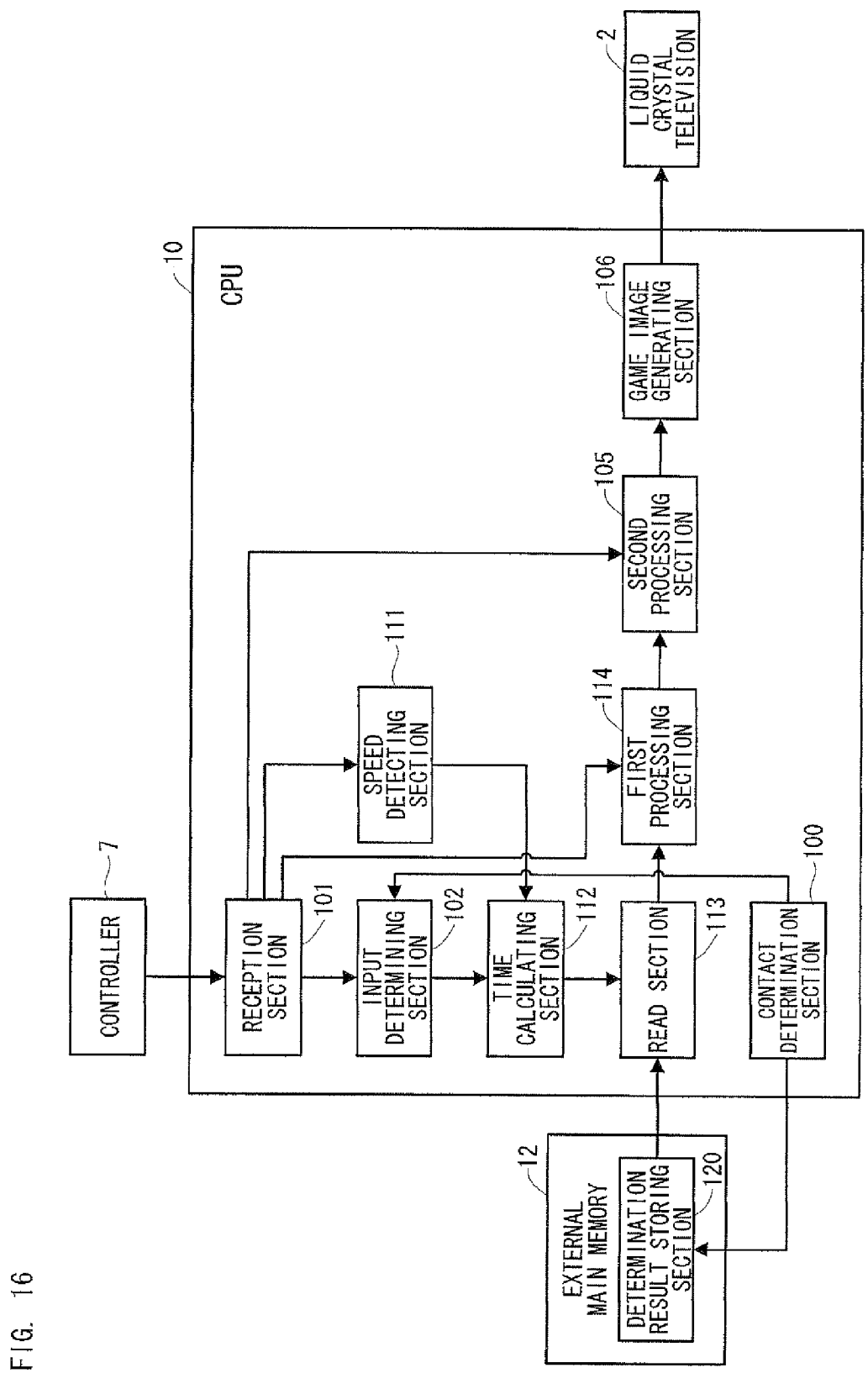
FIG. 16 is a diagram showing an exemplary functional configuration of a game apparatus which executes a game program stored in a storage medium according to a fourth embodiment of the present invention.

FIG. 16 is a diagram showing an exemplary functional configuration of the game apparatus 3 which executes a game program stored in a storage medium according to the fourth embodiment. As shown in FIG. 16, a CPU 10 of the game apparatus 3 functionally comprises a contact determination section 100, a reception reaction 101, an input determining section 102, a second processing section 105, and a game image generating section 106. Also, the CPU 10 functionally comprises a read section 113 and a first processing section 114 instead of the read section 103 and the first processing section 104, and further comprises a speed detecting section 111 and a time calculating section 112.

The speed detecting section 111 functions in a manner similar to the speed detecting section 111 of the third embodiment. The time calculating section 112 calculates the predetermined period of time based on the moving speed detected by the speed detecting section 111. For example, when the moving speed detected by the speed detecting section 111 is V1, the time calculating section 112 performs a predetermined calculation process to calculate the predetermined period of time as 2/60 sec. Thereafter, when the moving speed detected by the speed detecting section 111 is changed to V2 which is twice as high as V1, the time calculating section 112 calculates the predetermined period of time as 4/60 sec. Thus, the time calculating section 112 calculates the predetermined period of time in a manner which allows the predetermined period of time to increase with an increase in the moving speed detected by the speed detecting section 111. In this example, the predetermined period of time calculated by the time calculating section 112 is changed from 2/60 sec to 4/60 sec, depending on a change in the moving speed of the player object 30. Due to this change in the predetermined period of time, the size of a storage area used as the determination result storing section 120 is changed. Note that the read section 113 and the first processing section 114 function in a manner similar to that described in the second embodiment and will not be here described in detail.

Figure 17:
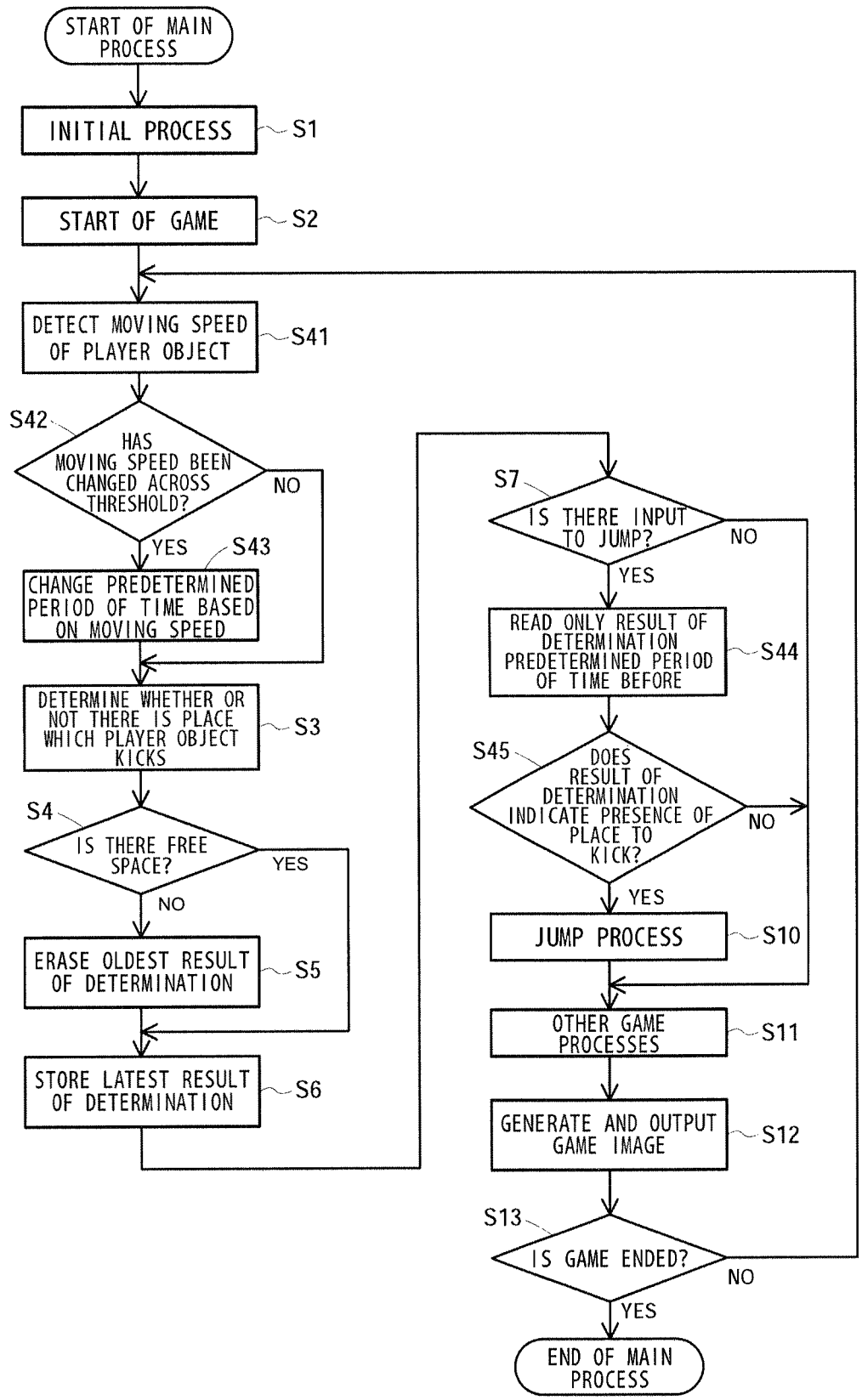
FIG. 17 is a flowchart showing an exemplary process performed by the game apparatus which executes the game program stored in the storage medium of the fourth embodiment of the present invention.

Hereinafter, process steps of the game apparatus 3 will be described with reference to FIG. 17. FIG. 17 is a flowchart showing an exemplary process performed in the game apparatus 3 which executes a game program stored in a storage medium according to the fourth embodiment of the present invention. Note that the process steps of FIG. 17 include the same process steps as those of FIG. 10, which are indicated by the same step numbers and will not be described.

After a game process is started in step S2 or when it is determined in step S13 that the game process has not been ended (step S13: NO), the speed detecting section 111 detects the moving speed of the player object 30 (step S41). When the moving speed of the player object 30 is detected, the time calculating section 112 determines whether or not the moving speed of the player object 30 has been changed across a threshold (step S42). In the game apparatus 3, a plurality of thresholds are set so as to categorize changes in the moving speed of the player object 30 into different discrete levels. In step S42, for each of all the thresholds, the time calculating section 112 determines whether or not the moving speed detected in step S41 becomes higher than the threshold and whether or not the moving speed detected in step S41 becomes lower than the threshold. When the time calculating section 112 determines that the moving speed of the player object 30 has not been changed across any threshold (step S42: NO), control proceeds to step S3.

When the time calculating section 112 determines that the moving speed of the player object 30 has been changed across any threshold (step S42: YES), the predetermined period of time is calculated so that the predetermined period of time increases with an increase in the moving speed detected by the speed detecting section 111 (step S43). For example, the process of step S43 is achieved by holding a table in which the ranges of the moving speed defined by the thresholds are associated with the numbers of frames, and reading out a corresponding number of frames from the table. By execution of the process of step S43, the number of results of determination stored in the determination result storing section 120 is changed.

In step S7, when the input determining section 102 determines that an operational input for causing the player object 30 to jump has been performed with respect to the controller (step S7: YES), the read section 113 reads out only a result of determination the predetermined period of time before from the determination result storing section 120 (step S44). In response to this, the first processing section 114 determines whether or not the result of determination read out by the read section 113 indicates that the player object 30 contacts the block 31 (step S45). Based on this, it is decided where the jump process of step S10 is to be performed.

As described above, according to the fourth embodiment of the present invention, as the moving speed of the player object 30 increases, an older result of determination is read out from the determination result storing section 120. Therefore, the influence of the error between the position of the player object 30 visually recognized by a player and the actual position of the player object 30 on a game process in the game apparatus 3 can be effectively reduced.

Note that the perception of the moving speed of the player object 30 varies from player to player. Therefore, it is not necessarily preferable to take into consideration only a result of determination the predetermined period of time before when it is decided whether or not the jump process is to be performed. Therefore, in step S44, all results of determination may be readout from the determination result storing section 120, taking into consideration the difference in perception of the moving speed of the player object 30 between individual players. Alternatively, a result of determination a predetermined period of time before and a latest result of determination may be read out from the determination result storing section 120.

Fifth Embodiment

Figure 18A:
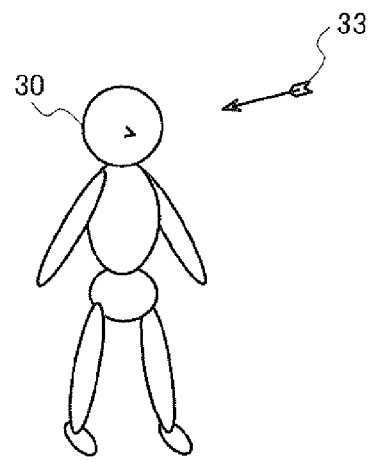
FIGS. 18A to 18C are diagrams showing game images representing how an arrow is moving toward a player object.
Figure 18B:
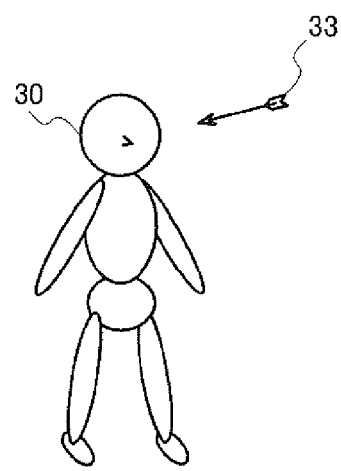
Figure 18C:
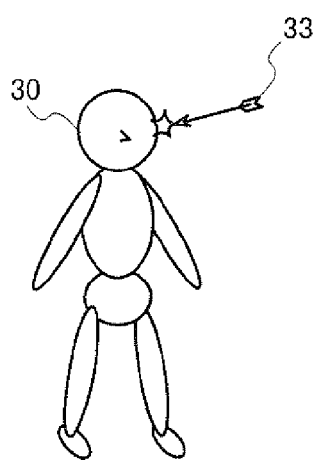

Hereinafter, a fifth embodiment of the present invention will be described. FIGS. 18A to 18C are diagrams showing game images representing how an arrow 33 is moving toward a player object 30. In the fifth embodiment, a case will be described where a first object is the player object 30, a second object is the arrow 33 which causes damage to the player object 30, and a damage process of causing damage to the player object 30 is performed as a predetermined process.

When the player object 30 is attacked with the arrow 33 shot from an enemy object (not shown), the player object 30 is damaged and the physical strength of the player object 30 is decreased. When the physical strength of the player object 30 becomes zero, a game is over. In the game apparatus 3, as a portion of a game process, it is repeatedly determined whether or not the player object 30 contacts the arrow 33. When there is a delay between the execution of the game process including the contact determination and the display of a game image showing a game space subjected to the game process on the liquid crystal television 2, a game image showing a game space of FIG. 18A delayed by, for example, two frames is displayed on the liquid crystal television 2 at the time when the contact determination is performed with respect of the player object 30 and the arrow 33 in a game space of FIG. 18C. Therefore, there may occur a phenomenon that even if a player who is viewing a game image (see FIG. 18A) displayed on the liquid crystal television 2 recognizes that the player object 30 can avoid the arrow 33, the game apparatus 3 determines that the player object 30 contacts the arrow 33 in a game space (see FIG. 18C) in which the contact determination is being performed, so that the player object 30 is damaged. In the fifth embodiment, a process which is performed in the game apparatus 3 so as to eliminate such a phenomenon will be described.

The game apparatus of the fifth embodiment has a configuration similar to that of the game apparatus 3 of the first embodiment, except for a portion of the functional configuration of the game apparatus. Therefore, in the fifth embodiment, the same components as those of the game apparatus 3 of the first embodiment are indicated by the same reference symbols and will not be described. Different points will be described.

Figure 19:
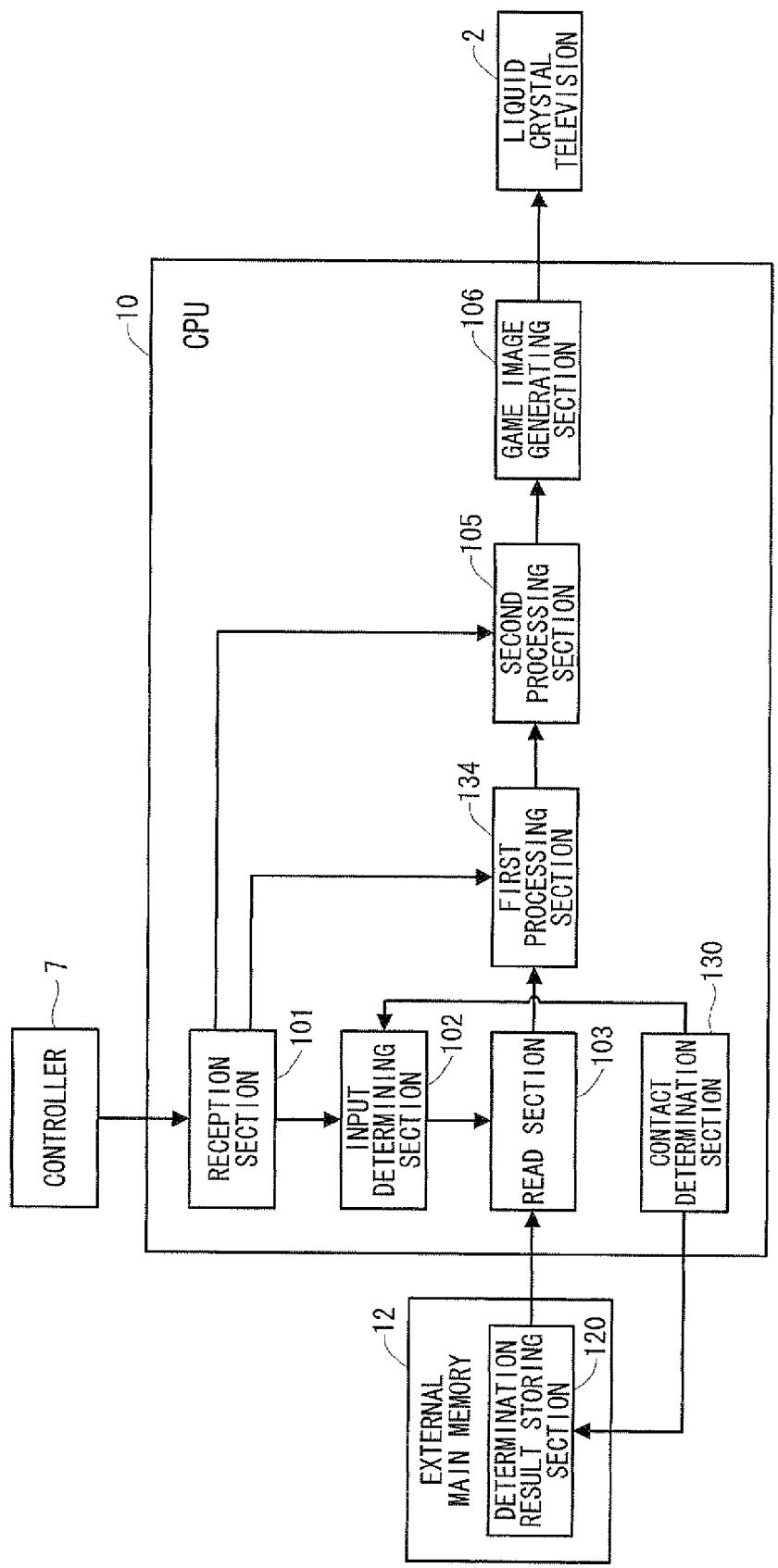
FIG. 19 is a diagram showing an exemplary functional configuration of a game apparatus which executes a game program stored in a storage medium according to a fifth embodiment of the present invention.

FIG. 19 is a diagram showing an exemplary functional configuration of the game apparatus 3 which executes a game program stored in a storage medium according to the fifth embodiment. As shown in FIG. 19, a CPU 10 of the game apparatus 3 functionally comprises, as in the first embodiment, a reception reaction 101, an input determining section 102, a read section 103, a second processing section 105, and a game image generating section 106. Also, the CPU 10 functionally comprises a contact determination section 130 and a first processing section 134 instead of the contact determination section 100 and the first processing section 104, which is different from the first embodiment.

The contact determination section 130 repeatedly determines whether or not the player object 30 contacts the arrow 33 (e.g., at intervals of 1/60 sec). This contact determination is performed in a manner similar to the process of determining whether or not the player object 30 contacts the block 31 and will not be here described.

The first processing section 134 determines whether or not all results of determination read out from the determination result storing section 120 by the read section 103 indicate that the player object 30 contacts the arrow 33. The first processing section 134 performs a damage process of causing damage to the player object 33 as the predetermined process only when all the results of determination indicate that the player object 30 contacts the arrow 33.

Figure 20:
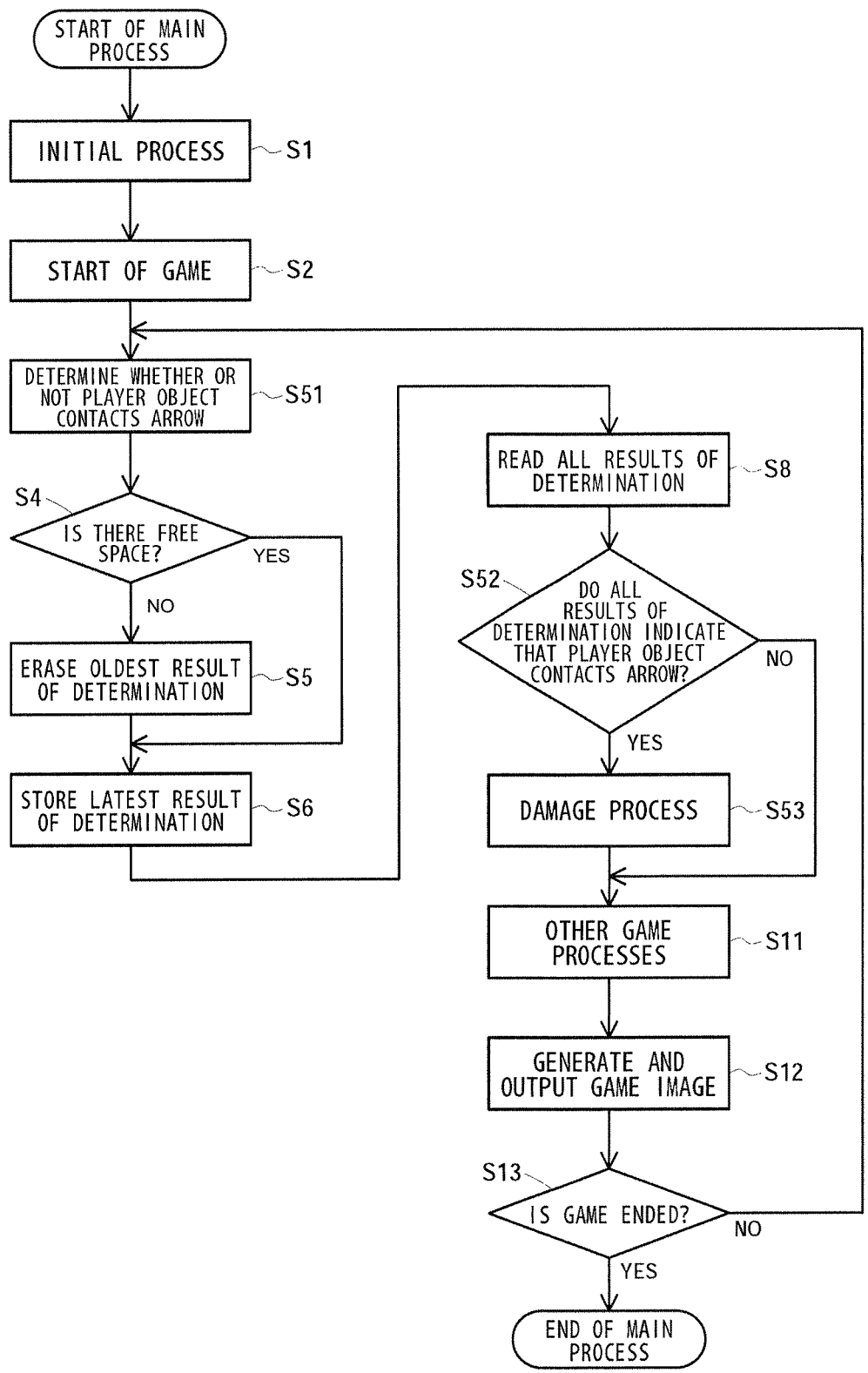
FIG. 20 is a flowchart showing an exemplary process performed by the game apparatus which executes the game program stored in the storage medium of the fifth embodiment of the present invention.
Figure 21A:
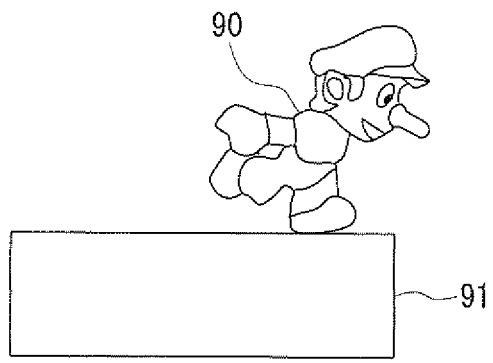
FIGS. 21A to 21C are diagrams showing game images representing how a player object moves on a block in a game space.
Figure 21B:
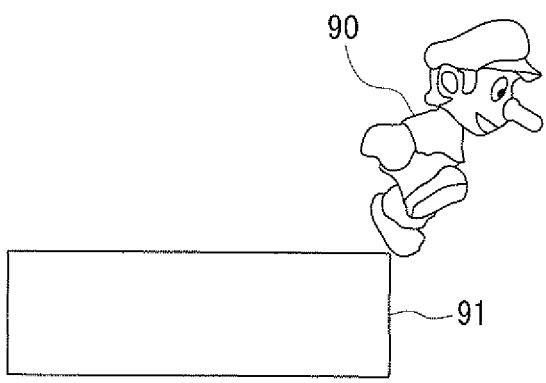
Figure 21C:
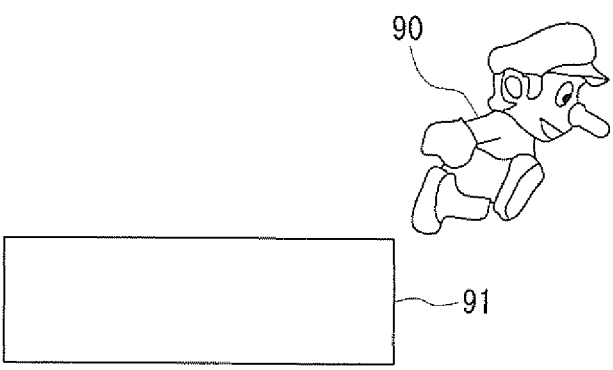

Hereinafter, process steps performed in the game apparatus 3 will be described with reference to FIG. 20. FIG. 20 is a flowchart showing an exemplary process performed in the game apparatus 3 which executes a game program stored in a storage medium according to the fifth embodiment of the present invention. Note that the process steps of FIG. 20 include the same process steps as those of FIG. 10, which are indicated by the same step numbers and will not be described.

After a game process is started in step S2 or when it is determined in step S13 that the game process has not been ended (step S13: NO), the contact determination section 130 determines whether or not the player object 30 contacts the arrow 33 (step S51). Therefore, in a process of step S6, a result of determination indicating that the player object 30 contacts the arrow 33 or a result of determination indicating that the player object 30 does not contact the arrow 33 is stored in the determination result storing section 120.

When a latest result of determination is stored into the determination result storing section 120, the read section 103 reads out all results of determination from the determination result storing section 120 (step S8). In response to this, the first processing section 134 determines whether or not all the results of determination thus read out indicate that the player object 30 contacts the arrow 33 (step S52). When the first processing section 134 determines that any of the results of determination indicates that the player object 30 does not contact the arrow 33 (step S52: NO), control proceeds to step S11. In other words, the damage process is not performed with respect to the player object 30. When determining that all the results of determination thus read out indicate that the player object 30 contacts the arrow 33 (step S52: YES), the first processing section 134 performs the damage process with respect to the player object 30 (step S53). Specifically, the first processing section 134 performs a process of reducing the physical strength of the player object 30.

As described above, when it is decided whether or not the damage process is to be performed with respect to the player object 30, a result of determination (a predetermined period of time before) with respect to a game space shown by a game image which a player is viewing is taken into consideration. Therefore, it is possible to prevent a game process illogical for a player, such as a process of causing damage to the player object 30 though the player recognizes that the player object 30 can avoid the arrow 33, from being performed.

Also, if at least one result of determination indicates that the player object 30 does not contact the arrow 33, the player object 30 is not damaged. Therefore, the player object 30 is less likely to be damaged, so that the difficulty of a game, such as a shooting game, an action game or the like, can be reduced.

Although it has been assumed in the first to fifth embodiments that the first object is the player object 30, the second object is another object which may contact the player object 30 (the block 31 or the arrow 33), the first and second objects may be other objects. For example, the player object 30 may be the second object and the arrow 33 may be the first object. In this case, as the predetermined process, a process of erasing the arrow 33 which contacts the player object 30 may be performed.

Also, although it has been assumed in the first to fourth embodiments that the jump process is performed as the predetermined process and it has been assumed in the fifth embodiment that the damage process is performed as the predetermined process, any of the jump processes of the first to fourth embodiments and the damage process of the fifth embodiment may be performed in combination. In this case, for example, as the predetermined process, two or more processes (e.g., the jump process and the damage process) may be selectively performed with respect to the player object 30 by the first processing section 104. For example, the jump process is permitted if at least one result of determination stored in the determination result storing section 120 indicates that the player object 30 contacts the block 31, while the damage process is permitted if all results of determination stored in the determination result storing section 120 indicate that the player object 30 contacts the arrow 33. Thus, predetermined conditions may be previously defined, depending on the predetermined process. As a result, the first processing section 104 can perform the predetermined process under optimal conditions which depend on the predetermined process.

Also, although it has been assumed in the first to fifth embodiments that the present invention is applied to an action game, the present invention is applicable to various games which require the contact determination with respect to objects, i.e., is applicable to a baseball game, a martial arts game and the like in addition to an action game, a shooting game and the like.

The present invention is applicable to a computer readable storage medium storing a game program executable by a computer of a game apparatus which performs the contact determination with respect to objects in a game space and performs a game process, depending on the result of determination, a game apparatus and the like.

While the invention has been described in detail, the foregoing description is in all aspects illustrative and not restrictive. It is understood that numerous other modifications and variations can be devised without departing from the scope of the invention.

What is claimed is:

1. A non-transitory computer readable storage medium storing a game program executable by a computer of a game apparatus which outputs to a display device a game image showing a behavior of an object in a game space, the game program causing the computer to execute instructions comprising:
   repeatedly determining whether or not a first object contacts a second object at a first point in time and at a second point in time, the second point in time being a latest result of determination stored after the first point in time;
   successively storing results of the repeated determination; and
   performing a predetermined process with respect to the first object when, of the results of the stored determination, at least one result of determination includes determining that the first object contacted the second object at the first point in time.

2. The non-transitory computer readable storage medium according to claim 1, wherein
   the predetermined process is performed with respect to the first object when at least one of a result of determining whether or not the first object contacts the second object at the first point in time and at the second point in time satisfies predetermined conditions.

3. The non-transitory computer readable storage medium according to claim 2, wherein
   the predetermined process is performed with respect to the first object when at least one of the result of determining whether or not the first object contacts the second object at the first point in time and at the second point in time indicates that the first object contacts the second object.

4. The non-transitory computer readable storage medium according to claim 2, wherein
   the game apparatus includes an input device which is operated by a player,
   the game program causes the computer to further execute instructions comprising:
   receiving an operational input from the input device, and
   performing the predetermined process with respect to the first object when at least one of a result of determination at the time of the reception of the operational input and a result of determination a predetermined period of time before the time of the reception of the operational input satisfies the predetermined conditions.

5. The non-transitory computer readable storage medium according to claim 1, wherein
the predetermined process is performed with respect to the first object when at least one of a result of determining whether or not the first object contacts the second object at the first point in time, the second point in time, or an intermediate point in time after the first point in time and before the second point in time, satisfies predetermined conditions.

6. The non-transitory computer readable storage medium according to claim 1, wherein
the predetermined process is performed with respect to the first object when only a result of determining whether or not the first object contacts the second object at the first point in time satisfies predetermined conditions.

7. The non-transitory computer readable storage medium according to claim 1, wherein
the predetermined process is performed with respect to the first object when the at least one result of determination indicates that the first object contacts the second object.

8. The non-transitory computer readable storage medium according to claim 1, wherein
the game apparatus includes an input device which is operated by a player,
the game program causes the computer to further execute instructions comprising:
receiving an operational input from the input device, and
the first object is a player object which behaves in the game space based on the received operational input.

9. The non-transitory computer readable storage medium according to claim 8, wherein
the game program causes the computer to further execute instructions comprising:
determining whether or not the received operational input is a predetermined operational input, and
performing the predetermined process only when the at least one result of determination satisfies the predetermined conditions and the received operational input is the predetermined operational input.

10. The non-transitory computer readable storage medium according to claim 9, wherein
the second object is an object representing a topographic feature, and
the predetermined process is a jump process of causing the first object to jump by kicking or hitting the second object.

11. The non-transitory computer readable storage medium according to claim 8, wherein
the second object is an object which causes damage to the first object, and
a damage process of causing damage to the first object is performed as the predetermined process when all of the results of determination indicate that the first object contacts the second object.

12. The non-transitory computer readable storage medium according to claim 8, wherein
two or more processes can execute as the predetermined process with respect to the first object, and
predetermined conditions are previously defined for each of the two or more processes.

13. The non-transitory computer readable storage medium according to claim 1, wherein
the display device is any of a liquid crystal television, a monitor of a personal computer, a projector and a plasma television, and
a predetermined period of time is set to correspond to a delay time between execution of the contact determination and display of a game image showing a game space subjected to the contact determination on the display device.

14. The non-transitory computer readable storage medium according to claim 13, wherein
the game program causes the computer to further execute instructions comprising:
receiving the delay time of the display device to which the game apparatus is connected; and
setting the predetermined period of time based on the received delay time.

15. The non-transitory computer readable storage medium according to claim 13, wherein
the game apparatus is communicably connected via a network to a database for storing identification information for identifying a display device in association with the delay time, and
the game program causes the computer to further execute instructions comprising:
acquiring the identification information of the display device to which the game apparatus is connected;
acquiring from the database a delay time corresponding to the acquired identification information; and
setting the predetermined period of time based on the acquired delay time.

16. The non-transitory computer readable storage medium according to claim 1, wherein
a predetermined period of time is based on a moving speed of the first object.

17. The non-transitory computer readable storage medium according to claim 16, wherein
the game program causes the computer to further execute instructions comprising:
detecting the moving speed of the first object; and
calculating the predetermined period of time based on the detected moving speed, and
calculating the predetermined period of time so that the predetermined period of time increases with an increase in the detected moving speed.

18. The non-transitory computer readable storage medium according to claim 1, wherein
the game program causes the computer to further execute instructions comprising:
detecting a moving speed of the first object;
determining whether or not the detected moving is a predetermined speed or higher, and
performing the predetermined process only when the at least one result of determination satisfies predetermined conditions that the detected moving speed is the predetermined speed or higher.

19. A game apparatus comprising at least one processor and for outputting to a display device a game image showing a behavior of an object in a game space, the at least one processor controlling the game apparatus to:
repeatedly determine whether or not a first object contacts a second object at a first point in time and at a second point in time, the second point in time being a latest result of determination stored after the first point in time;

successively store results of the repeated determination into a memory; and perform a predetermined process with respect to the first object when, of the results of determination stored in the memory, at least one result of determination includes determining that the first object contacted the second object at the first point in time.

20. A game processing method executable by a game apparatus having one or more processors which outputs to a display device a game image showing a behavior of an object in a game space, the method comprising:

repeatedly determining whether or not a first object contacts a second object at a first point in time and at a second point in time, the second point in time being a latest result of determination stored after the first point in time;

successively storing results of the repeated determination; and performing a predetermined process with respect to the first object when, of the results of the stored determination, at least one result of determination includes determining that the first object contacted the second object at the first point in time.

21. A game processing system, comprising:

a display device configured to display image data; and a game apparatus having one or more processors and configured to output to the display device a game image showing a behavior of an object in a game space, the one or more processors controlling the game apparatus to:

repeatedly determine whether or not a first object contacts a second object at a first point in time and at a second point in time, the second point in time being a latest result of determination stored after the first point in time, successively store results of the repeated determination into a memory, and perform a predetermined process with respect to the first object when, of the results of determination stored in the memory, at least one result of determination includes determining that the first object contacted the second object at the first point in time.

22. The non-transitory computer readable storage medium according to claim 1, wherein a duration between the first point in time and the second point in time is determined based on a visual delay time of the display device, and the predetermined process is performed taking into account the duration such that a display of the behavior of the first object in the game space is shown with substantially no visual delay time on the display device.

* * * * *